US008635309B2

(12) United States Patent
Berthiaume et al.

(10) Patent No.: US 8,635,309 B2
(45) Date of Patent: Jan. 21, 2014

(54) METHODS AND APPARATUS TO CHANGE A FEATURE SET ON DATA COLLECTION DEVICES

(75) Inventors: Guy H. Berthiaume, Charlotte, NC (US); Aldo M. Caballero, Charlotte, NC (US); James A. Cairns, Victor, NY (US); William H. Havens, Syracuse, NY (US); Thomas J. Koziol, Camillus, NY (US); James W. Stewart, E. Syracuse, NY (US); Ynjiun P. Wang, Cupertino, CA (US); Daniel D. Yeakley, Monroe, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 1468 days.

(21) Appl. No.: 11/836,347

(22) Filed: Aug. 9, 2007

(65) Prior Publication Data
US 2009/0044003 A1 Feb. 12, 2009

(51) Int. Cl.
*G06F 15/177* (2006.01)
*G06F 15/16* (2006.01)
*G06F 9/44* (2006.01)

(52) U.S. Cl.
USPC .......... 709/221; 709/217; 709/219; 709/220; 717/168; 717/171; 717/172; 717/173

(58) Field of Classification Search
USPC .................. 709/228, 201–207, 217–222; 717/168–173
See application file for complete search history.

(56) References Cited

U.S. PATENT DOCUMENTS

| 4,091,270 | A | 5/1978 | Musch et al. |
| 4,358,761 | A | 11/1982 | Iwasaki |
| 4,654,514 | A | 3/1987 | Watson et al. |
| 4,667,087 | A | 5/1987 | Quintana |
| 4,721,849 | A | 1/1988 | Davis et al. |
| 4,761,544 | A | 8/1988 | Poland |
| 4,774,715 | A | 9/1988 | Messenger et al. |
| 4,825,058 | A | 4/1989 | Poland |
| 4,841,132 | A | 6/1989 | Kajitani et al. |
| 4,864,302 | A | 9/1989 | Bowers |
| 4,868,375 | A | 9/1989 | Blanford |
| 4,868,376 | A | 9/1989 | Lessin et al. |
| 4,945,216 | A | 7/1990 | Tanabe et al. |
| 4,964,167 | A | 10/1990 | Kunizawa et al. |

(Continued)

Primary Examiner — Tae Kim
(74) Attorney, Agent, or Firm — Additon, Higgins, Pendleton & Ashe, P.A.

(57) ABSTRACT

Methods and apparatus for modifying the feature set of data collection devices are disclosed. Requests are receiving at a computer system different from the data collection device for a new configuration of the data collection device, the request including an identifier for the data collection device, identification of one or more features, and for each identified feature, an indication to modify the operation of a feature. The identifier may comprise an identifier that is unique for a particular data collection device or an indication of a group of devices, e.g. a model number. Prior to authorizing the new configuration, a determination may be made as to whether the identified data collection device(s) are suitable for the new configuration by consulting a configuration database. To implement the new configuration, an encoded authorization file is generated based on the requested configuration and the identifier of the data collection device(s). The encoded authorization file is transmitted to one or more data collection devices. Each data collection device that receives an encoded authorization file attempts to decode of the license using its identifier(s). If the authorization file is successfully decoded, a license key on that device is updated to implement the new configuration.

59 Claims, 10 Drawing Sheets

(56) References Cited

U.S. PATENT DOCUMENTS

| | | |
|---|---|---|
| 5,046,066 A | 9/1991 | Messnger et al. |
| 5,101,406 A | 3/1992 | Messenger et al. |
| 5,120,943 A | 6/1992 | Benz et al. |
| 5,166,499 A | 11/1992 | Holland et al. |
| 5,185,514 A | 2/1993 | Wike, Jr. et al. |
| 5,206,881 A | 4/1993 | Messenger et al. |
| 5,208,449 A | 5/1993 | Eastman et al. |
| 5,256,865 A | 10/1993 | Wike, Jr. et al. |
| 5,317,136 A | 5/1994 | Hasegawa et al. |
| 5,347,113 A | 9/1994 | Reddersen et al. |
| 5,389,917 A | 2/1995 | LaManna et al. |
| 5,450,491 A | 9/1995 | McNair |
| 5,488,223 A | 1/1996 | Austin et al. |
| 5,510,606 A | 4/1996 | Worthington et al. |
| 5,532,692 A | 7/1996 | Tatsuya et al. |
| 5,557,095 A | 9/1996 | Clark et al. |
| 5,579,487 A | 11/1996 | Meyerson et al. |
| 5,594,493 A | 1/1997 | Nemirofsky |
| 5,602,377 A | 2/1997 | Beller et al. |
| 5,610,595 A | 3/1997 | Garrabrant et al. |
| 5,640,684 A | 6/1997 | Konosu et al. |
| 5,644,601 A | 7/1997 | Kawaguchi |
| 5,646,389 A | 7/1997 | Bravman et al. |
| 5,668,803 A | 9/1997 | Tymes et al. |
| 5,744,788 A | 4/1998 | Metlitsky et al. |
| 5,748,904 A | 5/1998 | Huang et al. |
| 5,754,587 A | 5/1998 | Kawaguchi |
| 5,764,774 A | 6/1998 | Liu |
| 5,777,315 A | 7/1998 | Wilz et al. |
| 5,789,732 A | 8/1998 | McMahon et al. |
| 5,793,903 A | 8/1998 | Lopresti et al. |
| 5,794,145 A | 8/1998 | Milam |
| 5,802,179 A | 9/1998 | Yamamoto et al. |
| 5,804,802 A | 9/1998 | Card et al. |
| 5,805,779 A | 9/1998 | Christopher et al. |
| 5,815,811 A | 9/1998 | Pinard et al. |
| 5,818,032 A | 10/1998 | Sun et al. |
| 5,837,986 A | 11/1998 | Barile et al. |
| 5,838,720 A | 11/1998 | Morelli |
| 5,848,064 A | 12/1998 | Cowan |
| 5,859,970 A | 1/1999 | Pleso |
| 5,869,819 A | 2/1999 | Knowles et al. |
| 5,900,613 A | 5/1999 | Koziol et al. |
| 5,905,251 A | 5/1999 | Knowles |
| 5,912,921 A | 6/1999 | Warren et al. |
| 5,924,040 A | 7/1999 | Trompower |
| 5,930,393 A | 7/1999 | Ho et al. |
| 5,938,726 A | 8/1999 | Reber et al. |
| 5,939,699 A | 8/1999 | Perttunen et al. |
| 5,940,595 A | 8/1999 | Reber et al. |
| 5,945,660 A | 8/1999 | Nakasuji et al. |
| 5,946,344 A | 8/1999 | Warren et al. |
| 5,956,863 A | 9/1999 | Allen |
| 5,965,863 A | 10/1999 | Parker et al. |
| 5,973,681 A | 10/1999 | Tanigawa et al. |
| 5,986,651 A | 11/1999 | Reber et al. |
| 5,992,752 A | 11/1999 | Wilz, Sr. et al. |
| 5,995,105 A | 11/1999 | Reber et al. |
| 6,026,397 A | 2/2000 | Sheppard et al. |
| 6,027,024 A | 2/2000 | Knowles |
| 6,045,048 A | 4/2000 | Wilz, Sr. et al. |
| 6,068,188 A | 5/2000 | Knowles |
| 6,072,401 A | 6/2000 | Kumar |
| 6,119,944 A | 9/2000 | Mulla et al. |
| 6,147,767 A | 11/2000 | Petteruti et al. |
| 6,176,427 B1 | 1/2001 | Antognini et al. |
| 6,178,426 B1 | 1/2001 | Klein et al. |
| 6,182,897 B1 | 2/2001 | Knowles et al. |
| 6,199,044 B1 | 3/2001 | Ackley et al. |
| 6,206,286 B1 | 3/2001 | Watanabe et al. |
| 6,208,980 B1 | 3/2001 | Kara |
| 6,307,487 B1 | 10/2001 | Luby |
| 6,321,989 B1 | 11/2001 | Wilz, Sr. et al. |
| 6,321,991 B1 | 11/2001 | Knowles |
| 6,321,992 B1 | 11/2001 | Knowles et al. |
| 6,343,101 B1 | 1/2002 | Dong et al. |
| 6,345,764 B1 | 2/2002 | Knowles |
| 6,347,743 B2 | 2/2002 | Wilz, Sr. et al. |
| 6,384,744 B1 | 5/2002 | Philyaw et al. |
| 6,389,010 B1 | 5/2002 | Kubler et al. |
| 6,412,699 B1 | 7/2002 | Russell et al. |
| 6,491,223 B1 | 12/2002 | Longacre, Jr. et al. |
| 6,507,856 B1 | 1/2003 | Chen et al. |
| 6,507,864 B1 | 1/2003 | Klein et al. |
| 6,525,835 B1 | 2/2003 | Gulati |
| 6,529,146 B1 | 3/2003 | Kowalski et al. |
| 6,535,493 B1 | 3/2003 | Lee et al. |
| 6,539,360 B1 | 3/2003 | Kadaba |
| 6,539,422 B1 | 3/2003 | Hunt et al. |
| 6,540,140 B1 | 4/2003 | Knowles et al. |
| 6,540,142 B1 | 4/2003 | Alleshouse |
| 6,565,005 B1 | 5/2003 | Wilz et al. |
| 6,568,596 B1 | 5/2003 | Shaw |
| 6,578,766 B1 | 6/2003 | Parker et al. |
| 6,601,175 B1 * | 7/2003 | Arnold et al. ..................... 726/7 |
| 6,622,919 B1 | 9/2003 | Wilz et al. |
| 6,655,593 B2 | 12/2003 | Alleshouse |
| 6,697,805 B1 | 2/2004 | Choquier et al. |
| 6,698,656 B2 | 3/2004 | Parker et al. |
| 6,758,403 B1 | 7/2004 | Keys et al. |
| 6,764,009 B2 | 7/2004 | Melick et al. |
| 6,764,011 B2 | 7/2004 | Entani et al. |
| 6,772,947 B2 | 8/2004 | Shaw |
| 6,776,342 B1 | 8/2004 | Thuries et al. |
| 6,823,388 B1 | 11/2004 | Philyaw et al. |
| 6,854,651 B2 | 2/2005 | Smith et al. |
| 6,860,427 B1 | 3/2005 | Schmidt et al. |
| 6,873,435 B1 | 3/2005 | Tehranchi et al. |
| 6,902,114 B2 | 6/2005 | Hashimoto et al. |
| 6,908,034 B2 | 6/2005 | Alleshouse |
| 6,969,002 B2 | 11/2005 | Creamer et al. |
| 6,976,062 B1 | 12/2005 | Denby et al. |
| 6,987,927 B1 | 1/2006 | Battaglia et al. |
| 7,055,737 B1 | 6/2006 | Tobin et al. |
| 7,059,525 B2 | 6/2006 | Longacre et al. |
| 7,075,676 B2 | 7/2006 | Owen et al. |
| 7,104,456 B2 | 9/2006 | Parker et al. |
| 7,114,021 B2 | 9/2006 | Seshadri |
| 7,159,214 B2 | 1/2007 | Rajaram et al. |
| 7,207,491 B2 | 4/2007 | Lubow |
| 7,216,238 B2 | 5/2007 | Herrod et al. |
| 7,337,317 B2 | 2/2008 | Meggitt et al. |
| 7,367,514 B2 | 5/2008 | Soule, III et al. |
| 7,383,998 B2 | 6/2008 | Parker et al. |
| 7,387,253 B1 | 6/2008 | Parker et al. |
| 7,398,929 B2 | 7/2008 | Longacre, Jr. et al. |
| 7,398,930 B2 | 7/2008 | Longacre, Jr. |
| 7,546,954 B2 | 6/2009 | Longacre, Jr. et al. |
| 7,934,660 B2 | 5/2011 | Yeakley et al. |
| 8,196,832 B2 | 6/2012 | Soule, III et al. |
| 8,397,992 B2 | 3/2013 | Longacre, Jr. et al. |
| 2001/0043273 A1 | 11/2001 | Herrod et al. |
| 2001/0051915 A1 | 12/2001 | Ueno et al. |
| 2002/0032749 A1 * | 3/2002 | Isherwood et al. ........... 709/217 |
| 2002/0066095 A1 | 5/2002 | Yu |
| 2002/0066788 A1 | 6/2002 | Knowles |
| 2002/0070278 A1 | 6/2002 | Hung et al. |
| 2002/0081038 A1 | 6/2002 | Moule |
| 2002/0111924 A1 | 8/2002 | Lewis |
| 2002/0150245 A1 | 10/2002 | Sugimoto et al. |
| 2002/0156894 A1 * | 10/2002 | Suorsa et al. .................. 709/226 |
| 2003/0024990 A1 | 2/2003 | Wilz et al. |
| 2003/0048882 A1 | 3/2003 | Smith |
| 2003/0136841 A1 | 7/2003 | Alleshouse |
| 2003/0173405 A1 | 9/2003 | Wilz et al. |
| 2003/0197062 A1 | 10/2003 | Shaw |
| 2003/0228063 A1 | 12/2003 | Nakayama et al. |
| 2004/0002943 A1 | 1/2004 | Merrill et al. |
| 2004/0003388 A1 | 1/2004 | Jacquemot et al. |
| 2004/0149826 A1 | 8/2004 | Alleshouse |
| 2004/0194081 A1 | 9/2004 | Qumei et al. |
| 2004/0206823 A1 * | 10/2004 | Blake et al. ............. 235/462.31 |
| 2005/0165784 A1 * | 7/2005 | Gomez et al. ..................... 707/9 |

(56) References Cited

U.S. PATENT DOCUMENTS

| | | | |
|---|---|---|---|
| 2006/0026304 A1* | 2/2006 | Price | 710/8 |
| 2006/0064488 A1* | 3/2006 | Ebert | 709/225 |
| 2006/0095331 A1* | 5/2006 | O'Malley et al. | 705/22 |
| 2006/0195563 A1* | 8/2006 | Chapin et al. | 709/223 |
| 2006/0248524 A1 | 11/2006 | Seely | |
| 2007/0088825 A1* | 4/2007 | Hodul | 709/225 |
| 2007/0152058 A1 | 7/2007 | Yeakley et al. | |
| 2008/0033882 A1* | 2/2008 | Kafkarkou et al. | 705/52 |
| 2008/0197193 A1 | 8/2008 | Overhultz et al. | |
| 2012/0194320 A1 | 8/2012 | Yeakley et al. | |

\* cited by examiner

METHODS AND APPARATUS TO CHANGE A FEATURE SET ON DATA COLLECTION DEVICES

BACKGROUND OF THE INVENTION

Data collection devices are a class of device used to collect, process, and transfer data to a data processing system. Data collection devices may be provisioned with one or more of a variety of data collection sub-systems including: imager, laser scanner, RFID scanner, and magnetic media scanner. Such sub-systems generally scan some data bearing device such as dataforms (e.g. barcodes), magnetic stripes, and RFID tags. The collected data is processed within the data collection device by a processor and associated circuits. The type and amount of processing may vary depending on the class of device, but usually includes at a minimum, decoding the output of the data collection sub-system to generate a string of data corresponding to the encoded data contained within the data bearing device. The decoded data is then generally transferred using any number of wired and wireless communication paths, such as 802.11, cellular, IrDA, USB, serial and parallel paths.

Generally, data collection devices can be thought of as falling into three classes: fixed, mobile, and handheld. Fixed devices are generally incorporated into stationary objects such as point of sale systems (examples include transaction terminals and image kiosks) and walls (examples include RFID tracking devices). Mobile devices generally have similar electronic configurations to fixed devices, but are mechanically designed to be mounted on movable objects, such as carts and fork lifts. Finally, hand held devices are designed to be carried around by a user. Popular categories of hand held data collection devices include portable data terminals (PDTs), transaction terminals, image kiosks, and hand held bar code scanners.

Much like the computer industry in general, data collection devices are becoming commoditized, with competing units adopting similar specifications with respect to subsystems such as data collection, communication, and processors. Much of the differentiation between products therefore lies in the ability of a manufacturer to supply a particular configuration at a specified price level.

As such, most if not all data collection devices may be purchased in a variety of configurations. On a software level, it is known to provide modular software, wherein each module adds functionality to the system as a whole. On a hardware level, taking PDTs as an example, not only is it possible to purchase a single model of a PDT in a vast number of configurations (for example 150 different configurations is not unknown), but most of the subsystems within any one configuration have an extensive set of parameters that, depending on the values thereof, cause the subsystem to operate in a variety of different manners.

However, to streamline manufacturing, the number of different hardware and software configurations manufactured or assembled and offered to customers should be minimized. Accordingly the present inventors have invented methods and apparatus to limit the number of manufacturing configurations of data collection devices while enabling an increased number of possible product configurations. To that end, the present inventors have invented methods and apparatus for the post-sale secure activation, modification, and de-activation of features of data collection devices. Further, the present inventors have enabled the provisioning of secure software updates to data collection devices.

BRIEF DESCRIPTION OF THE DRAWINGS

An understanding of the present invention can be gained from the following detailed description of one or more embodiments of the invention, taken in conjunction with the accompanying drawings of which.

DETAILED DESCRIPTION

Figure 1A:
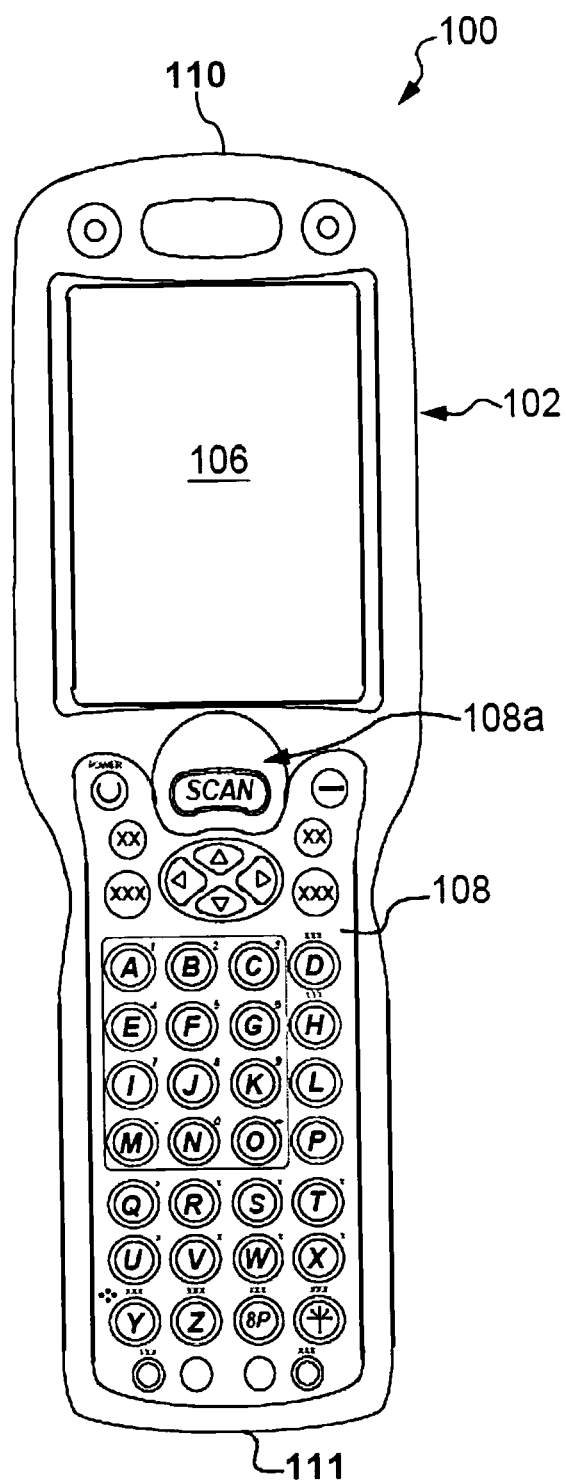
FIG. 1a is a plan view of a PDT.

Reference will now be made in detail to embodiments of the present invention examples of which are illustrated in the accompanying drawings, wherein like reference numerals refer to like elements throughout. It is to be noted that an element number followed by a letter generally indicates multiple occurrences of elements that are similar in structure and/or function. Further, the use of an italicized "n" associated with an element number generally denotes either an unspecified number of instances of such element or a partial or complete grouping of such elements—the meaning of which is to be drawn from the context of such use.

A method is here, and generally, conceived to be a sequence of steps or actions leading to a desired result and may be implemented as software. While it may prove convenient to discuss such software as if embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may find favor in the present description, there is no intention to limit the scope of the claims through such preferential use.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a microprocessor, but may be executed using other circuits. For example, the methods could be implemented on a digital signal processor, a FPGA, or with HDL (Hardware Design Language) in an ASIC.

Figure 1B:
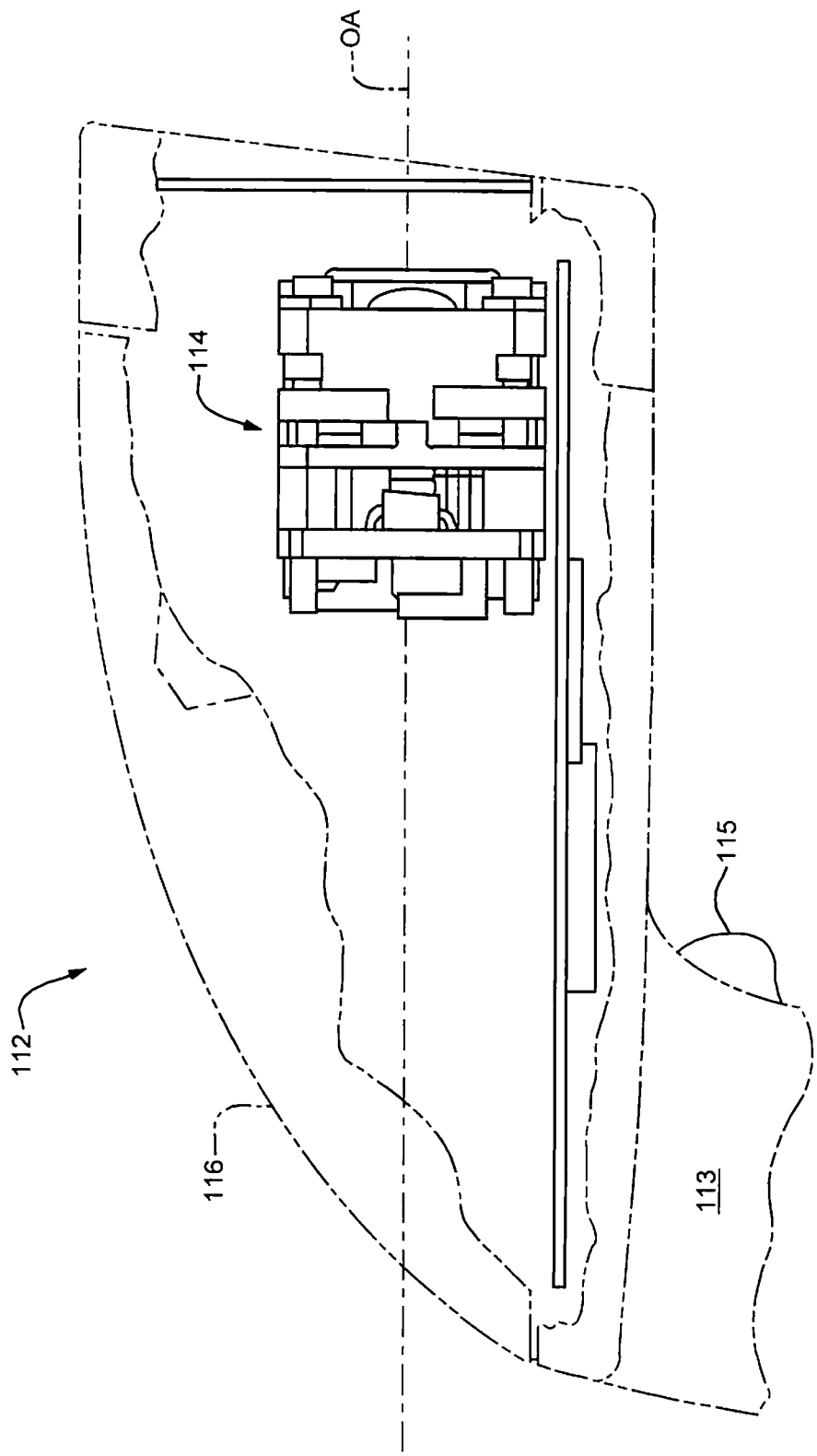
FIG. 1b is a partial cutaway view of an optical indicia reader.
Figure 2A:
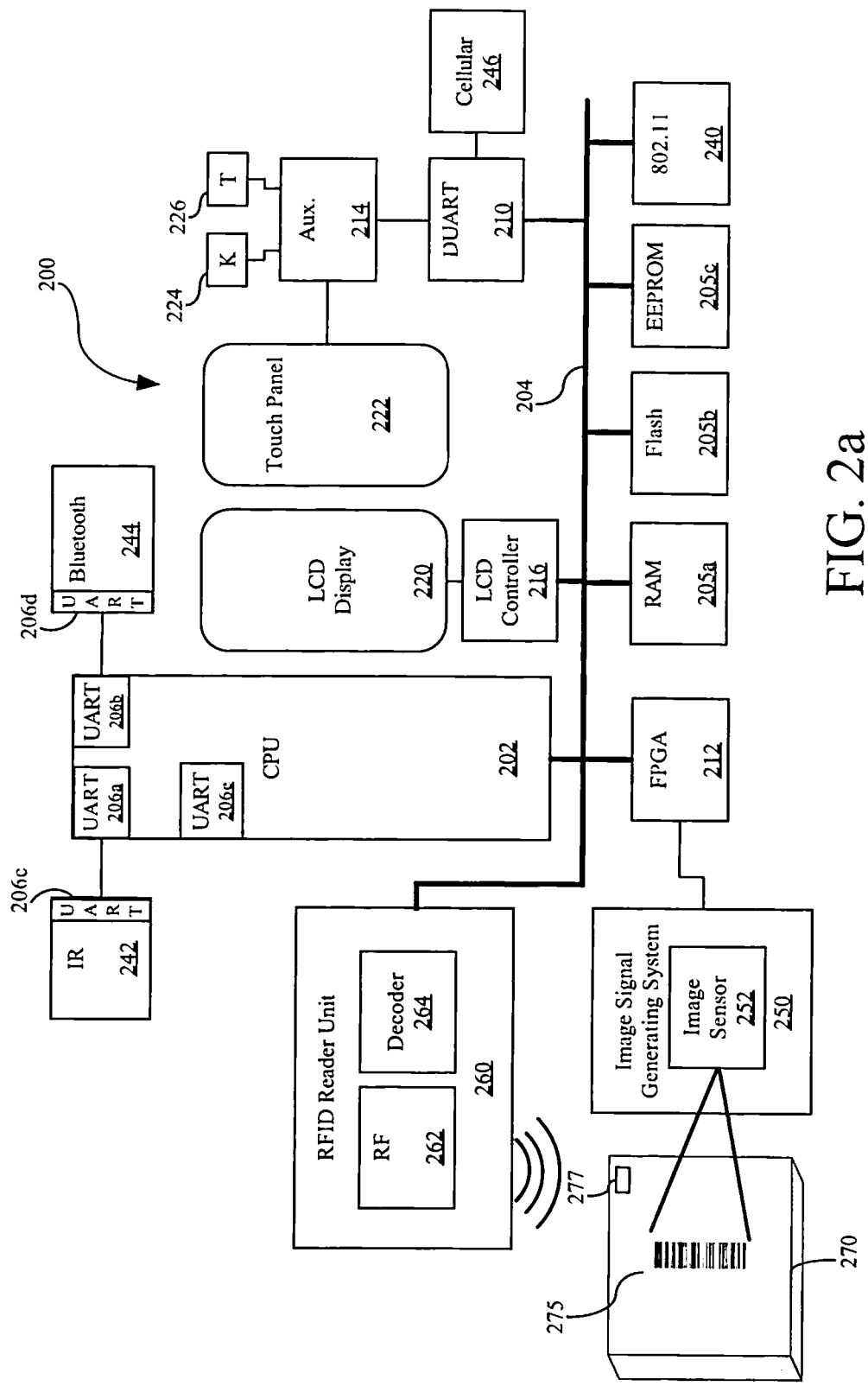
FIG. 2a is a block diagram of a PDT.
Figure 2B:
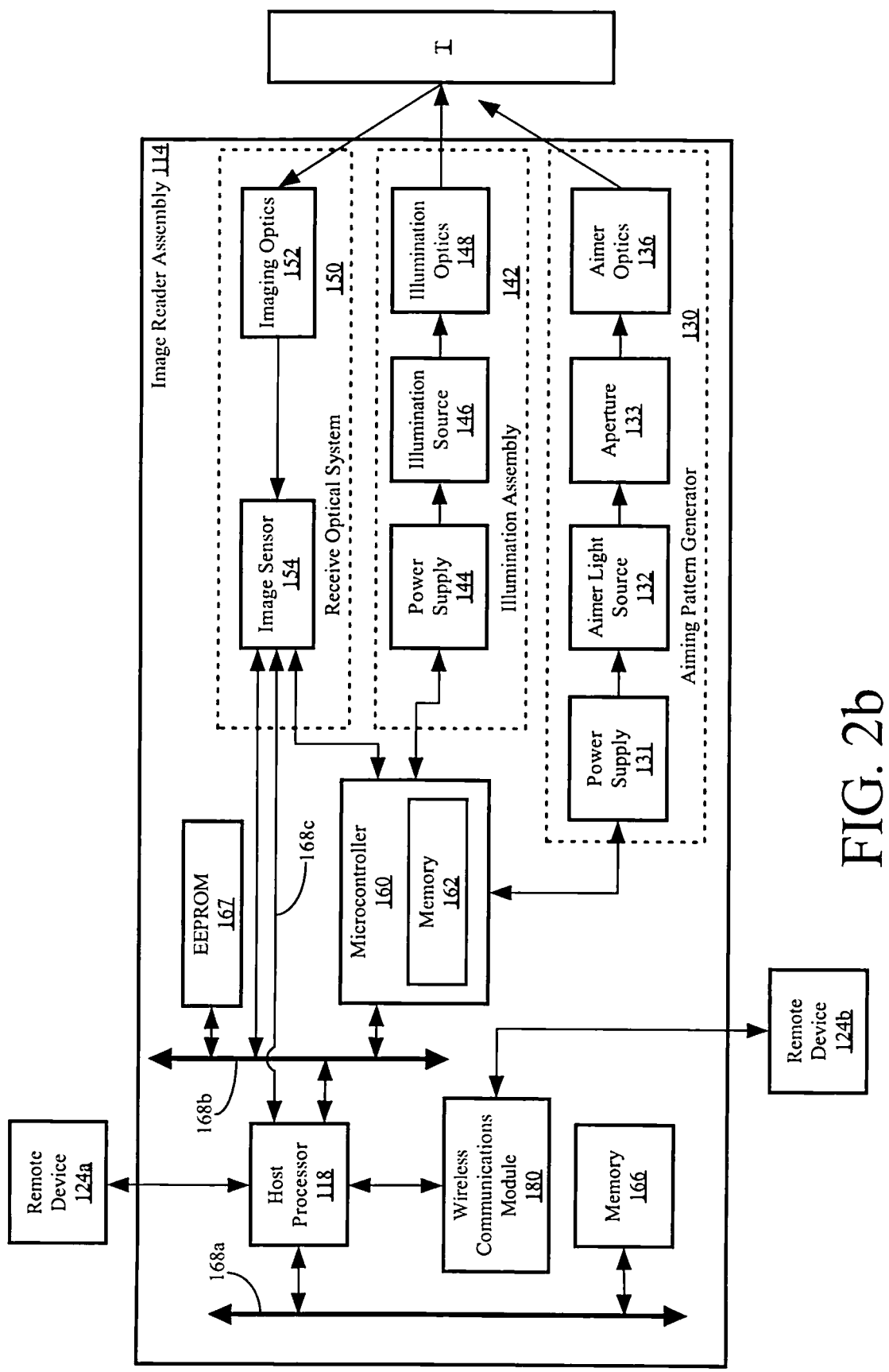
FIG. 2b is a block diagram of an optical indicia reader.

FIGS. 1a, 1b, 2a, and 2b illustrate two types of data collection devices; PDTs (FIGS. 1a and 2a) and hand held bar code scanners (FIGS. 1b and 2b). When viewed at a systems level, PDTs and hand held bar code scanners illustrate the variety of sub-systems utilized by data collection devices, with fixed and mobile systems being generally more complicated than hand held bar code scanners but perhaps not quite as complex as PDTs. As such, while the following discussion focuses on PDTs and hand held bar code scanners, the described embodiments of the present invention encompass all data collection devices.

PDTs generally integrate a mobile computer, one or more data transport paths and one or more data collection subsystems. The mobile computer portion is generally similar to known touch screen consumer oriented portable computing devices (e.g. "Pocket PCs" or "PDAs"), such as those available from PALM, HEWLETT PACKARD, and DELL. The data transport paths include wired and wireless paths, such as 802.11, IrDA, BLUETOOTH, RS-232, USB, CDMA, GSM (incl. GRPS), and so forth. The data collection subsystem generally comprises a device that captures data from an external source, for example, touches, keystrokes. RFID signals, images, and bar codes. PDTs further distinguish from consumer oriented portable computing devices through the use of "industrial" components integrated into a housing that provide increased durability, ergonomics, and environmental independence over consumer oriented devices. Additionally, PDTs tend to provide improved battery life by utilizing superior batteries and power management systems. PDTs are available from several sources, including the assignee of the present application: HAND HELD PRODUCTS, INC.

FIG. 1a is a plan view of a known PDT 100. The PDT 100 utilizes an elongated water resistant body 102 supporting a variety of components, including: a battery (not illustrated); a touch screen 106 (generally comprising a LCD screen under a touch sensitive panel); a keypad 108 (including a scan button 108a); a scan engine (not illustrated); and a data/charging port (also not illustrated). The scan engine may comprise, for example, one or more of an image engine, a laser engine, or an RFID engine. The scan engine is generally located near a top end 110 of the PDT 100. The data/charging port typically comprises a proprietary mechanical interface with one set of pins or pads for transmitting and receiving data (typically via a serial interface standard such as USB or RS-232) and a second set of pins or pads for receiving power for operating the system and/or charging the battery. The data charging port is generally located near a bottom end 111 of the PDT 100.

In use, the user presses the scan key 108a to initiate data capture via the scan engine. The captured data is analyzed, e.g. decoded to identify the information represented, stored and, displayed on the touch screen 106. Additional processing of the data may take place on the PDT 100 and/or an external data processing resource to which the data is transmitted.

FIG. 2a is a block diagram of a known PDT 200. A central processing unit (CPU) 202 receives data from and outputs data to other sub-systems for storage, transmission, and additional processing. The CPU 202 typically comprises one or more of a number of off-the-shelf solutions including: embedded processors, such as an XSCALE® processor available from MARVELL® TECHNOLOGY GROUP; general purpose processors, such as a PENTIUM® 4 available from INTEL®; or any number of custom solutions including preconfigured field programmable gate arrays (FPGAs) and application specific integrated circuits (ASICs). Overall operation of the CPU 202 is controlled by software or firmware (typically referred to as an operating system) stored in one or more memory locations 205n, such as: RAM 205a; FLASH memory 205b; and EEPROM 205c. Examples of suitable operating systems for the PDT 200 include graphical user interfaces such as WINDOWS MOBILE®, WINDOWS® CE, WINDOWS® XP, LINUX, PALM®, and OSX operating systems.

In general, communication between the CPU 202 and the various sub-components takes place via one or more ports or busses, including a main system bus 204; a plurality of Universal Asynchronous Receiver/Transmitter (UART) ports 206n; and a Dual Universal Asynchronous Receiver/Transmitter (DUART) 210.

A variety of secondary processors may be provided to perform general and application specific functions. The example illustrated in FIG. 2a provides three such processors: a field programmable gate array (FPGA) 212; an auxiliary processor 214; and an LCD controller 216. The FPGA 212 may comprise any number of FPGAs including the Virtex-4 family of FPGAs available from XILINX. The FPGA 212 is used to interface with one or more data acquisition systems as described hereinafter. The auxiliary processor 214 may comprise any number of embedded (or general purpose) processors, including the PICmicro® family of microcontrollers available from MICROCHIP TECHNOLOGY. The auxiliary processor 214 interfaces with and controls a variety of data input devices including, for example a touch sensitive panel 222, a keypad 224, and a scan key or trigger 226. The LCD controller 216 may comprise any number of available controllers including, for example, one of the available EPSON LCD controllers. As its name and connections suggest, the LCD controller 216 controls the display of images on an LCD display 220, such as any number of displays available from SHARP. The combination of the LCD 220 and the touch sensitive panel 222 is often referred to as a "touch screen."

The PDT 200 may further include a plurality of communication links such as an 802.11 communication link 240, an IR communication link 242, a Bluetooth communication link 244, and a cellular communication link 246 for communication with a cellular network such as a network in accordance with the Global System for Mobile Communications (GSM) network. The 802.11 communication link 240 interfaces with the CPU 202 via the main system bus 204. The IR communication link 242, and Bluetooth communication link 244 are connected to the CPU 202 via UART channels 206n. The cellular communication link 246 is connected to the CPU 202 via the DUART 210. Wired communication may be conducted via a UART, such as the UART 206e.

The PDT 200 may be configured to activate a data collection subsystem based on the actuation of a key on the keypad 224 (including the trigger 226) or a touch on the touch panel 222. In addition to the touch panel 222 and keyboard 224, a variety of suitable data collection subsystems may be integrated into the PDT 200. In the example shown in FIG. 2a, two such systems are illustrated: an image signal generation system 250 and an RFID reader unit 260. Data acquisition subsystems may be controlled with either the main CPU 202 or a secondary processor. For example the image signal generation system 250 is illustrated as being controlled by the FPGA 212. Possible configurations of the FPGA 212 are illustrated in U.S. Pat. No. 6,947,612 incorporated herein by reference. As another example, the RFID reader unit 260 is illustrated as being controlled, via the system bus 204, by the CPU 202.

The image signal generating system 250 generally comprises a two dimensional solid state image sensor 252 (such as a CCD, a CMOS, or a CID) for capturing an image containing data, e.g. an image, a bar code, or a signature. Two-dimensional solid state image sensors generally have a plurality of photo sensor picture elements ("pixels") which are formed in a pattern including a plurality of rows and a plurality of columns of pixels. The image signal generating system 250 further includes imaging optics (not shown) focusing an image onto an active surface of the image sensor 252. Image sensor 252 may be incorporated on an image sensor IC chip having disposed thereon image sensor control circuitry, image signal conditioning circuitry, and an analog-to-digital converter. FPGA 212 manages the capture and transfer of image data into memory 205n. Possible configurations of the FPGA 212 are illustrated in U.S. Pat. No. 6,947,612 incorporated herein by reference. Decoding may be performed by the CPU 202 or any suitable secondary processor. Examples of suitable image signal generation system 250 include the 5000 2D engine series available from Hand Held Products, assignee of the present application, such as the 5X00 and 5X80 engines.

One use of the image signal generating system 250 is reading and interpreting bar codes such as bar code 275 on an item 270. In this mode, when trigger button 226 is actuated, the CPU 202 causes the appropriate control signals to be sent to the image sensor 252. In response thereto, the image sensor 252 outputs digital image data including a representation of the bar code symbol 275. This data is acquired by the FPGA 212 where it is collected and subsequently transferred to memory 205n. In accordance with a decoding program (not specifically illustrated but typically executed by either the FPGA 212 or the CPU 202) an attempt may be made to decode the bar code represented in the captured digital image representation. The capture and decoding of image data may occur automatically in response to a trigger signal being generated by activation of the trigger 226. For example, the CPU 202 may be configured, typically through execution of a program resident in memory 205n, to continuously capture and decode bar code symbols represented therein until either a successful decode is completed or the trigger 226 is released. The cycle may also be terminated by timing out after a number of unsuccessful decode attempts.

In addition to having a decode mode of operation, the image signal generation system 250 may also be configured for an image capture mode of operation. In an image capture mode of operation, an electronic image representation is captured without attempting a decode. It is also possible to capture an image including a bar code and then decode the bar code, with or without making use of the non-bar code area of the captured image. The captured electronic image representation may be one or more of (i) stored into a designated memory location of memory 205n, (ii) transmitted to an external device, or (iii) displayed on LCD 220. This mode may be used to capture, for example an image of a signature or damage to a package.

The RFID reader unit 260 includes an RF oscillation and receiver circuit 262 and a data decoder 264. RFID reader unit 260 may be configured to read RF encoded data from a passive RFID tag, such as tag 277, which may be disposed on article 270. In such a case, RF oscillation and receiver circuit 262 transmits a carrier signal to the passive tag which in turn converts the carrier energy to voltage form and actuates a transponder (not shown) to transmit a radio signal representing the encoded tag data. RF oscillator and receiver circuit 262, in turn, receives the radio signal from the tag and converts the data into a digital format. Data decoder 264, typically including a low cost microcontroller IC chip, decodes the received radio signal information received by RF oscillator and receiver circuit 262 to decode the encoded identification data originally encoded into RFID tag 277.

RFID reader unit 260 may, for example, operate in a selective activation mode or in a continuous read operating mode. In a selective activation mode, RFID reader unit 260 broadcasts radio signals in an attempt to activate a tag or tags in its vicinity in response to an RFID trigger signal being received. In a continuous read mode, the RF oscillation and receiver circuit 262 continuously broadcasts radio signals in an attempt to actuate a tag or tags in proximity to the PDT 200 automatically, without receiving a trigger signal. PDT 200 may be configured so that the CPU 202 recognizes a trigger signal under numerous conditions, such as: (1) actuation of the trigger 226; (2) receipt of an RFID trigger instruction (for example generated by a software program); or (3) a determination that some other predetermined condition has been satisfied.

Referring to FIGS. 1b and 2b, the exemplary hand held bar code scanner 112 (referred to as "scanner 112") has a number of subsystems for capturing images and decoding dataforms within such images. The scanner 112 has an imaging reader assembly 114 provided within a head portion or housing 116 connected to a handle portion 113. A trigger 115 is used to control operation of the scanner 112. The head portion 116 has a medial plane MP selected so that the scanner 112 is held with the head portion generally horizontal. The medial plane MP should generally be perpendicular to the face of the scanning head 116 as operators have a tendency to hold the medial plane of the head portion of the imager approximately normal to the plane of the target when collecting data.

Referring to FIG. 2b, the image reader assembly 114 generally comprises a read optical system 150, an illumination assembly 142, an aiming pattern generator 130 and a variety of control and communication modules. The read optical system 150 generates frames of data containing indications of the intensity of light received by the read optical system 150. The illumination assembly 142 illuminates a target T creating reflections that are received by the read optical system 150. The aiming pattern generator 130 projects an aiming light pattern to assist with aiming the scanner 112. While the present description employs an imager based data collection subsystem (the image reader assembly 114), it is to be recognized that the data collection subsystem may take other forms such as a laser scanner.

The receive optical system 150 generally comprises imaging receive optics 152 and an image sensor 154. The imaging receive optics 152 receives light reflected from a target T and projects the reflected light on to the image sensor 154. The image sensor 154 may comprise any one of a number of two-dimensional, color or monochrome solid state image sensors using such technologies as CCD, CMOS, NMOS, PMOS, CID, CMD, etc. . . . One possible sensor is the MT9V022 sensor from Micron Technology Inc. Such sensors contain an array of light sensitive photodiodes (or pixels) that convert incident light energy into electric charges.

Many image sensors are employed in a full frame (or global) shutter operating mode, wherein the entire imager is reset prior to an image capture operation to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out. It is also known to employ a rolling shutter.

The illumination assembly 142 generally comprises a power supply 144, illumination sources 146 and illumination optics 148. The illumination optics 148 directs the output of the illumination sources 146 (generally comprising LEDs or the like) onto the target T. The light is reflected off the target T and received by the receive optical system 150. It is to be noted that the illumination provided by the illumination assembly 142 may be combined with (or replaced by) other sources of illumination, including ambient light from sources outside of the scanner 112.

The aiming pattern generator 130 generally comprises a power supply 131, light source 132, aperture 133, and optics 136. The aiming pattern generator 130 creates an aiming light pattern projected on or near the target which spans a portion of the receive optical system's 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc., figures, whether continuous or discontinuous, i.e., defined by sets of discrete dots, dashes, and the like. Alternately, the aimer pattern generator may be a laser pattern generator.

Generally, the aiming light source 132 may comprise any light source which is sufficiently small or concise and bright to provide a desired illumination pattern at the target. For example, the light source 132 may comprise one or more LEDs, such as part number NSPG300A made by Nichia Corporation. Illumination and aiming light sources with different colors and combination of colors may be employed, for example white, green and red LEDs. The colors may chosen based on the color of the symbols most commonly imaged by the image reader. Different colored LEDs may be each alternatively pulsed at a level in accordance with an overall power budget.

The light sources 132 may also be comprised of one or more laser diodes such as those available from Rohm. In this case a laser collimation lens (not shown in these drawings) will focus the laser light to a spot generally forward of the scanning head and approximately at the plane of the target T. This beam may then be imaged through a diffractive interference pattern generating element, such as a holographic element fabricated with a desired pattern in mind. Examples of these types of elements are known, commercially available items and may be purchased, for example, from Digital Optics Corp. of Charlotte, N.C. among others.

A host processor 118 provides overall control of the image reader assembly 114. The host processor 118 and other components of the image reader assembly are generally connected by one or more buses 168n and/or dedicated communication lines. In the illustrated example a parallel bus 168a connects the host processor 118 to a main system memory 166 used to store processed (and unprocessed) image data from the image sensor 154. The host processor utilizes an I²C bus 168b to communicate exposure settings to the image sensor 154 and illumination parameters to a microcontroller 160. A dedicated 8 to 10 bit parallel bus 168c is used to transfer image data from the image sensor 154 to the host processor 118. The width of the bus 168c may be dependant on the bit size recorded by each pixel in the image sensor 154. The output of the image sensor 154 is processed by a host processor 118 utilizing one or more functions or algorithms to condition the signal appropriately for use in further processing downstream, including being digitized to provide a digitized image of target T.

Another function of the host processor 118 is to decode machine readable symbology represented within an image captured by the image sensor 154. Information respecting various reference decode algorithms is available from various published standards, such as by the International Standards Organization ("ISO").

The microcontroller 160 maintains illumination parameters, used to control operation of the illumination assembly 142 and the aiming pattern generator 130, in a memory 162. For example, the memory 162 may contains tables indicative of power settings for the power supply 144 and 131 corresponding to various states of the signal from the image sensor 154. Based upon signals from the host processor 118 and/or the image sensor 154, the microcontroller 160 sends signals to the power supplies 131 and 144 based on values stored in the table in memory 162. An exemplary microcontroller 160 is the CY8C24223A made by Cypress Semiconductor Corporation.

The image reader assembly 114 may be provided with one or more communication paths for communicating with remote devices 124n, such as networks, network interfaces (e.g. routers hubs and switches), other scanners, data collection devices, computers, or data storage devices (e.g. hard drives). In general, such communications paths are either wired or wireless and may either be integrated with the host processor 118 or implemented as one or more separate modules. In the example illustrated in FIG. 2b, a wired connection, such as UARTS, USB serial, parallel, scan wedge, or Ethernet, is shown as being integrated with the host processor 118. On the other hand, a wireless connection, such as IrDA, BLUETOOTH, GSM, GPRS, EDGE, and 802.11, is illustrated as being implemented via a wireless communication module 180.

Figure 3:
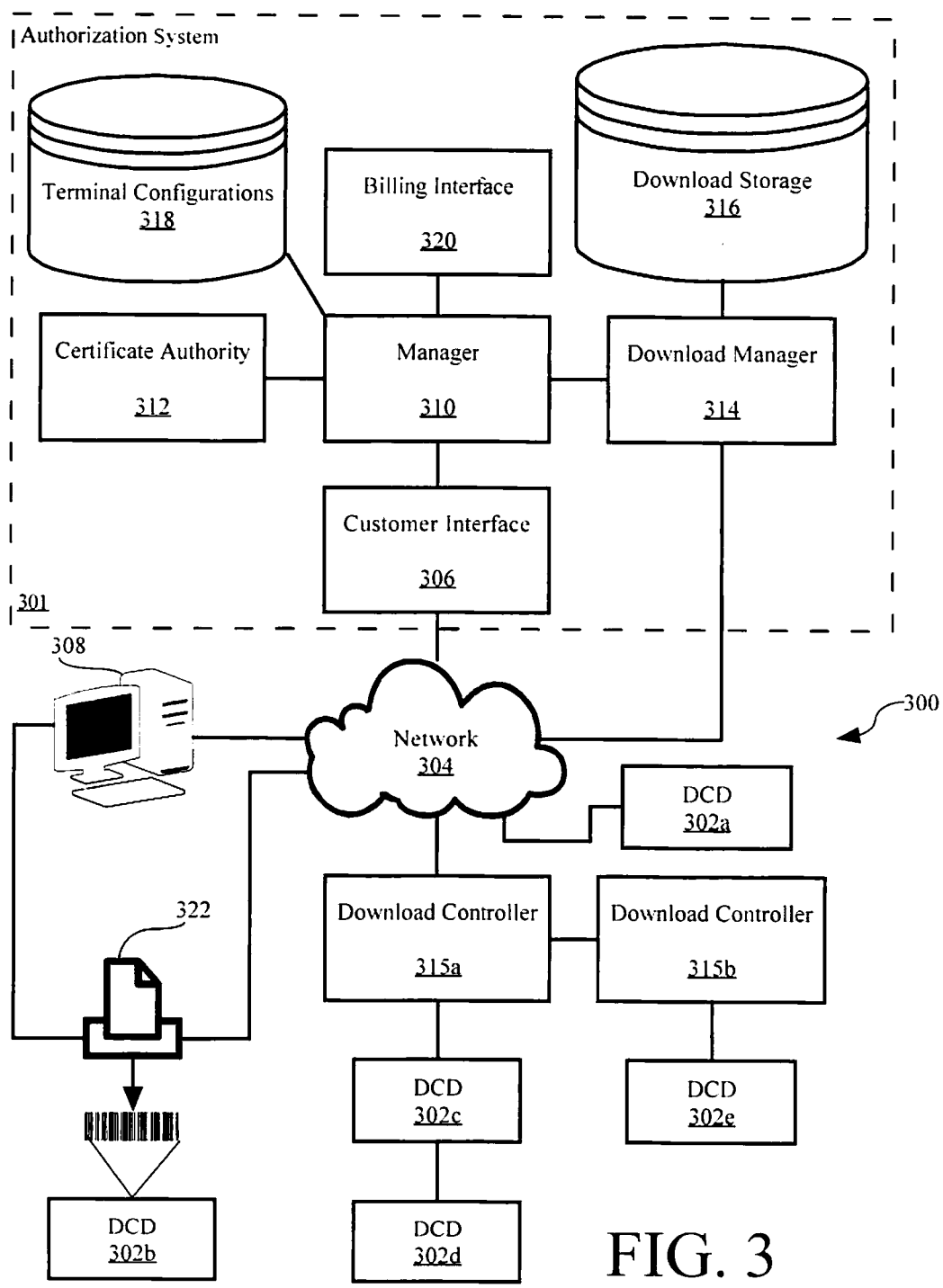
FIG. 3 is a block diagram of a system in accordance with at least one embodiment of the present invention.

FIG. 3 is a block diagram of a system 300 in accordance with at least one embodiment of the present invention. The system 300 may be used to remotely configure data collection devices 302n (referred to herein as "DCD" or in the plural as "DCDs"), such as the PDT 100 and the hand held bar code reader 112, by selectively enabling, modifying, and/or disabling, in whole or part, the operation of software, hardware or a combination thereof—such operations being referred to herein as features. One potentially advantageous use is to sell a data collection device wherein one or more features, while present, are disabled. Such disabled features may be subsequently enabled upon the satisfaction of provider conditions, such as the payment of a licensing fee. Another potentially advantageous use is to utilize the system 300 for the distribution, installation, and activation of new features on to a DCD 302n. As with the prior use, new features may be conditioned upon the satisfaction of provider conditions, such as the payment of a licensing fee and the downloading of specified software. Yet another potentially advantageous use is to utilize the system 300 to change the configuration of a DCD 302n, by activating and deactivating features. As with the prior uses, the configuration may be conditioned upon the satisfaction of provider conditions, such as the payment of a licensing fee.

While, the following description concentrates on the ability to upgrade a DCD 302n through the addition and/or activation of features, it is to be remembered that the present invention is useful for a variety of tasks, including configuring hardware and software, activating, deactivating, adding, swapping and removing features. As such, terms such as "update" and "upgrade" are meant to encompass any change in the features or configuration of the subject device, whether such change be additive or subtractive or merely just a change.

In one exemplary embodiment, the data collection device stores data (referred to herein as a "license key") indicating which features are enabled and which features are disabled. The license key may be checked at start up and/or each time a call is made to a listed feature. Only those features indicated as being enabled will be executed. TABLE 1 illustrates an example of the type of data a suitable license key might contain along with examples of features that may be enabled and disabled.

TABLE 1

LICENSE KEY STRUCTURE

| DATA SEGMENT | DESCRIPTION |
| --- | --- |
| Version Control | Indicates the version of the license key. |
| Encryption Flag | Indicates which of the data segments are encrypted and how they are encrypted. |
| AutoID Features | Indicates status of Auto Identification features such as: 1D decode; 2D decode; IQ Imaging; symbologies (e.g. PDF, 2D Matrix, AZTEC, etc . . . ): and OCR. |
| RDM Features | Indicates status of remote device management features such as: performance monitoring; software feature; event logging; and help desk. |
| Machine Vision Features | Indicates status of machine vision features such as: video recording; video manipulation; video streaming; dimensioning; mark recognition; color image capture; and picture quality assessment. |
| Other Features | Indicates status of features such as: Active Communication Paths (e.g. BLUETOOTH ® wireless, Host, Keyboard Wedge, Wi-Fi certified, and WPAN); GPS; Imager; RFID; Ethernet; voice recognition; autofocus; focusing methods; and OS features. |
| $1^{st}$ Party Software | Used to enable software provided by manufacturer. |
| $3^{rd}$ Party Software | Used to enable third party software. |
| Reserved | For future use. |

Generally, each segment contains one or more data entries (fields). In Table 1, the initial segments describe the table itself while the remaining segments are dedicated to various categories of features that may be enabled or disabled. For each feature the corresponding indication may be as simple as a flag indicating whether each feature is to be enabled or disables. It is also possible to indicate parameters for the operation of enabled features and/or operational limitations for the use of a feature. For example, the indication may contain an expiration date beyond which the feature is to be disabled or a number of permitted uses (perhaps in the form of a counter to be decremented each time a check of that feature in the license table is made).

The license key can be stored in a variety of data structures, such as a registry, a record, a file, an XML or an HTML structure. Regardless of the data structure utilized, the license key should be physically stored in an area normally inaccessible by the user to protect against a user enabling features to which the manufacture wishes to limit access. A secondary non-volatile memory structure, such as flash memory, an EEPROM, an embedded flash memory card, or a battery backed-up RAM, is ideal. For example, the license key may be stored in the EEPROM 205c in the portable data terminal 200 illustrated in FIG. 2a or an EEPROM 167 in the image reader assembly 114 in FIG. 2b. Other example of possible locations include registry structures associated with the operating system and removable memory structures, such as USB FLASH memory devices, that may be plugged in a startup, or whenever the license key is checked, and removed for normal operation. It is to be noted that the data comprising the key need not be stored contiguously or in a single memory structure. It may prove beneficial to split the key up into multiple data chunks (using content or size to determine where to split) and distribute the resulting data chunks throughout memory. It may also prove beneficial to store part or the entire key on a memory structure external to the DCD 302n, such as a remote server or dongle. It may further prove beneficial to use dummy bits (randomly generated bits of data) within the license key to obfuscate the significant bits from prying eyes.

One method to secure the license key is to limit the ability to modify the license key to the service department of a manufacturer, such as by preventing access to the write enable signal on the pertinent memory structure. Such a condition requires that a user return the DCD 302n to a manufacturer to change the feature set on their units, e.g. by changing the memory chip. A more user friendly method would be to place a license key management program on the DCDn that, responsive to messages (referred to herein as "authorization files") from the manufacturer, modifies the license key to enable or disable selected features. The authorization files may be encrypted or otherwise secured such that only the license key management program can decrypt and utilize the authorization file.

In general, an authorization file is software or data which the receiving data collection device is programmed to verify prior to implementing a configuration change. In accordance with at least one embodiment, an authorization file generally includes an identification of an approved data collection device and an indication of the changes to be made to the license key. For example, the indication may be encoded as a bit field to be OR'd with one or more data segments of the license key. As another example, the indication may comprise a set of instructions to update all or portions of the license key. In yet another example, the authorization file may be formatted as an XML file, listing affected features along with instruction on how to whether to enable, disable, or configure such features.

All or a portion of the authorization file may be encrypted so as to limit the applicability or availability of the file to a designated data collection device or group of data collection devices. For example, such encryption may utilize any of a variety of keyed systems, such as any of a number of public key infrastructure (PKI) based methods. Another possibility would be a hash based on an identifier associated with the data collection device. The identifier may comprise a unique string such as a serial number or a group identifier such as a model number. It may prove preferable if the chosen identifier was stored in a location inaccessible to the general user. Many DCD are encoded with suitable unique and group identifiers in a block of data designated for use during the manufacturing process. Access to such data is typically through low-level software calls. It is to be noted that a wide variety of security methods may be employed to secure the authorization file, including a variety of trusted-server schemes (utilizing a trusted server for key agreement between nodes), public-key schemes (utilizing asymmetric cryptography with a public-ken infrastructure), and key pre-distribution schemes (where key information is distributed to all DCD 302n prior to deployment).

In addition to the keyed encryption, it may also be beneficial to ensure the integrity of the unencrypted authorization file. For example, a checksum or a combination of a random or predetermined numbers may be included with or appended to the authorization file. Where the encryption key is based on the identification number of the requesting data collection device there may be no need for the identification number to be included as an actual part of the authorization file in-so-much as the ability to decode the encrypted file is dependent upon supplying the correct identification number. It may further prove beneficial to include dummy bits within the authorization file to obfuscate the active bits from prying eyes.

TABLE 2 illustrates an exemplary authorization file.

the frame until a successful decode occurs or a time out condition arises. The PDT 200 may be limited to decoding 1-D symbols by limiting the execution of decoding algorithms to those related to 1-D symbols. Additionally or alternatively, the image generation system 250 may be configured to transfer only a portion of the full output of the image sensor 252 when in 1-D mode; this is sometimes referred to as a windowing mode. For example, a limited number of rows of the image sensor 252 may be transferred. Such a limited transfer not only reinforces limiting the capabilities of the PDT 200 to 1-D symbols, but may also enhance the decoding process by limiting the amount of data transferred and processed to that required for 1-D decodes.

The 2-D decode capability may be activated by reconfiguring the PDT 200, for example by enabling 2-D decode algorithms and permitting the passage of data from the entire image sensor 252. Utilizing a system similar to the exemplary system 300 illustrated in FIG. 3, such a reconfiguration may be conditioned upon the receipt of an authorization file by the PDT 200.

It may prove beneficial to ensure that only those PDTs for which the customer has obtained authorization are modified. By encrypting all or a portion of the authorization file with a unique data feature of a PDT (e.g. the PDT's serial number or imaging engine identification) the authorization file may be rendered useless to other, non-authorized PDTs. Either in the alternative or additionally, the authorization file can be associated with a counter that expires after a certain number of

TABLE 2

AUTHORIZATION FILE

| DATA SEGMENT | DESCRIPTION |
| --- | --- |
| Version Control | Contains an indication of the usable versions of license key. |
| Encryption | Indicates what, if any, encryption is utilized on the activation bits segment (and possibly the integrity segment). Such encryption may use a unique identifier (or group identifier) of the destination device as a key. |
| Activation bits | A bit field used to modify the license key. May be broken into segments to correspond with the structure of the license key (this reduces the size by only transferring those segments for which a change is desired) |
| Integrity | Used to ensure the integrity (and possibly identify the source) of the file. Examples include a checksum, symmetric keys, a MDC hash, PKI, and so on |

Referring once again to FIG. 3, the system 300 includes an authorization system 301 that: generates authorization files; stores files required for upgrading DCDs 302n; maintains configurations of individual DCDs, and facilitates the transfer of such files to DCDs 302n. The system 300 also facilitates the restricted distribution of software based on the satisfaction of pre-determined conditions, such as receipt of funds, and limiting the activation of such software to a pre-determined number of units. Those of ordinary skill in the art will recognize that the system 300 is applicable for use with a variety of DCDs of all classes (e.g. fixed, mobile and hand held) and in a variety of configurations, including PDTs, hand held bar code scanners, presentation bar code scanners, and RFID scanners.

One example of a use to which the system 300 may be applied is limiting a 2-D capable hand held bar code reader to 1-D operation. Referring back to the PDT 200 in FIG. 2a, remember that during operation, the image generation system 250 outputs a frame of data to the FPGA 212 to initiate an attempted decode of a dataform represented within the frame. To decode, a series of decoding algorithms are attempted on units have been updated, a certain amount of time has passed, or a defined date and time have been reached. This facilitates a reasonably secure, yet user friendly, upgrade path in an enterprise environment.

Accordingly, the system 300 facilitates a sale of a DCD 302n at a potentially attractive price point for users that initially need a limited set of features but desire the potential to update without a new hardware launch, or without significant down time for existing units. Using the foregoing example, a customer may only need (and be willing to pay for) the ability to scan and decode 1-D barcodes, but desires the promise of a hassle-free future upgrade to 2-D capability. The system 300 permits such upgrades to be implemented upon receipt of an authorization file, the availability of which may, in turn, be conditioned upon the satisfaction of certain criteria such as the receipt of a fee and a determination that the unit for which the upgrade is sought is upgradeable.

The authorization system 301 generally comprises a customer interface 306, a manager 310 with associated terminal configuration database 318, a certificate authority 312, a download manager 314 with associated storage 316, and a billing interface 320 any of which may be embodied on a single computer or distributed among multiple computers.

The manager 310 controls access to software and data, including authorization files. In particular, the manager 310 verifies that any conditions precedent have been satisfied prior to authorizing and enabling (or de-authorizing and disabling) features on DCDs 302n. Conditions for authorization may vary, but generally include: receipt of payment, suitability of the requested changes for the identified DCD 302n and availability of the feature. Payment is generally handled by the billing interface 320, while the suitability of a feature may be determined by the manager 310 using the terminal configuration database 318.

In operation, the manager 310 receives feature change requests through a customer interface 306. The customer interface 306 generally comprises a web server, such as APACHE or WEBSPHERE that may be accessed utilizing any computer capable of web based communication, such as a PC 308 or even a DCD 302n. Feature change requests may include an indication of the feature(s) being activated or deactivated and identification of the DCD(s) 302n for which the change request is being submitted. If the request is for one or more DCDs 302n for which individual identifiers, e.g. serial number, are being provided, the feature change request is referred to as an individual authorization request. Alternatively, the request may be made for one or more DCDs 302n for which no unique identification is provided; rather a group identification is provided. The group identification may comprise a model number, a customer number, etc. . . . Such a request, termed herein a bulk authorization request, may be useful when a customer wants to change the feature set on a large number of devices (and hence the reluctance to provide individual identifiers) and/or an identifiable subset of their device pool, e.g. all devices in a certain geographical location or of a certain type.

Next, a determination is made as to whether the requested feature change is suitable for the identified DCD(s) 302n. In this context, suitability may involve simply whether certain necessary software and/or hardware features or capabilities are present—in other words, whether the requested feature change is technically possible. Alternatively, suitability may involve factors other than the technical, such as whether the customer is considered eligible for the requested feature change. The determination may be as simple as checking a table cross-referencing a model number with features. If the new feature set is suitable, the manager 310 utilizes a billing interface 320 to obtain payment.

The billing interface 320 may comprise any number of commercially available billing and/or payment processing systems, such as those provided by PAYPAL, POWERTRACK, and CARDSERVICE INTERNATIONAL. It is also to be noted that no payment may be required, for example, the change may be gratis or the customer may be billed at a later date. When payment conditions have been satisfied, the change request is considered approved and any data and/or files necessary to implement the requested changes on the DCD 302n are provided to the download manager 314.

Once the manager 310 authorizes the change request a message is sent to the download manager 314 instructing the download manager 314 to provide (or remove) access to files associated with the change request. This message may include an appropriate authorization file (as generated by the certificate authority 312) and copies of, or links to, any associated data or software files. The download manager 314 stores files and/or links thereto (including authorization files as needed) in storage 316 and provides access thereto for authorized users using for example an HTTPS or FTP server (e.g. the WinSock File Transfer Protocol (WSFTP)). The file may be encrypted using any of a number of methods. For example, the files may be encrypted using an identifier associated with the DCD 302a for which the files are being stored. The identifier may comprise a unique string such as a serial number or a group identifier such as a model number. It may even be preferable to use a third party solution such as that provided by SENDTHISFILE.COM. In conjunction with the transfer of files, the download manager 314 updates an access table to permit the authorized user, e.g. a DCD 302n or an agent thereof, to retrieve the files. An authorized user may be identified by the manager 310 based on the records retrieved from the terminal configuration database 318 or as entered by the customer via the customer interface 306.

Figure 4:
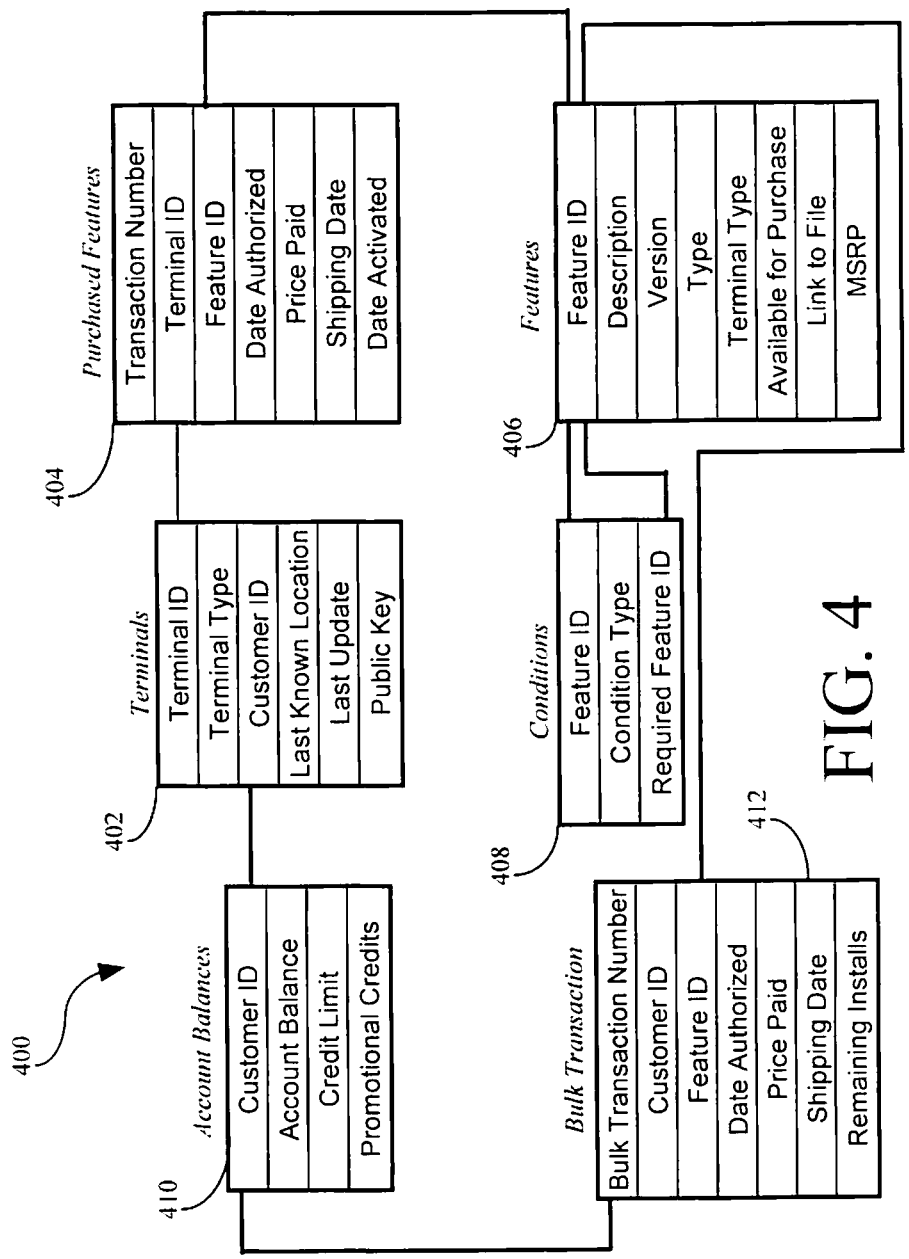
FIG. 4 is a simplified representation of a database structure for use as a terminal configuration database in conjunction with at least one embodiment of the present invention.

FIG. 4 is a simplified representation of a database structure 400 for use with the terminal configuration database 318. The structure 400 generally comprises six tables: a terminal table 402, a purchased feature table 404, and features table 406, a conditions table 408, an account balances table 410 and a bulk transaction table 412. Only those tables and fields that are relevant to the various embodiments discussed herein are illustrated. For example, in a production system it is anticipated that the database 400 would include a customer table and a terminal type table. It is also anticipated that a variety of additional tables and fields may be utilized for a variety of purposes—such as manufacturing and accounting.

Figure 5:
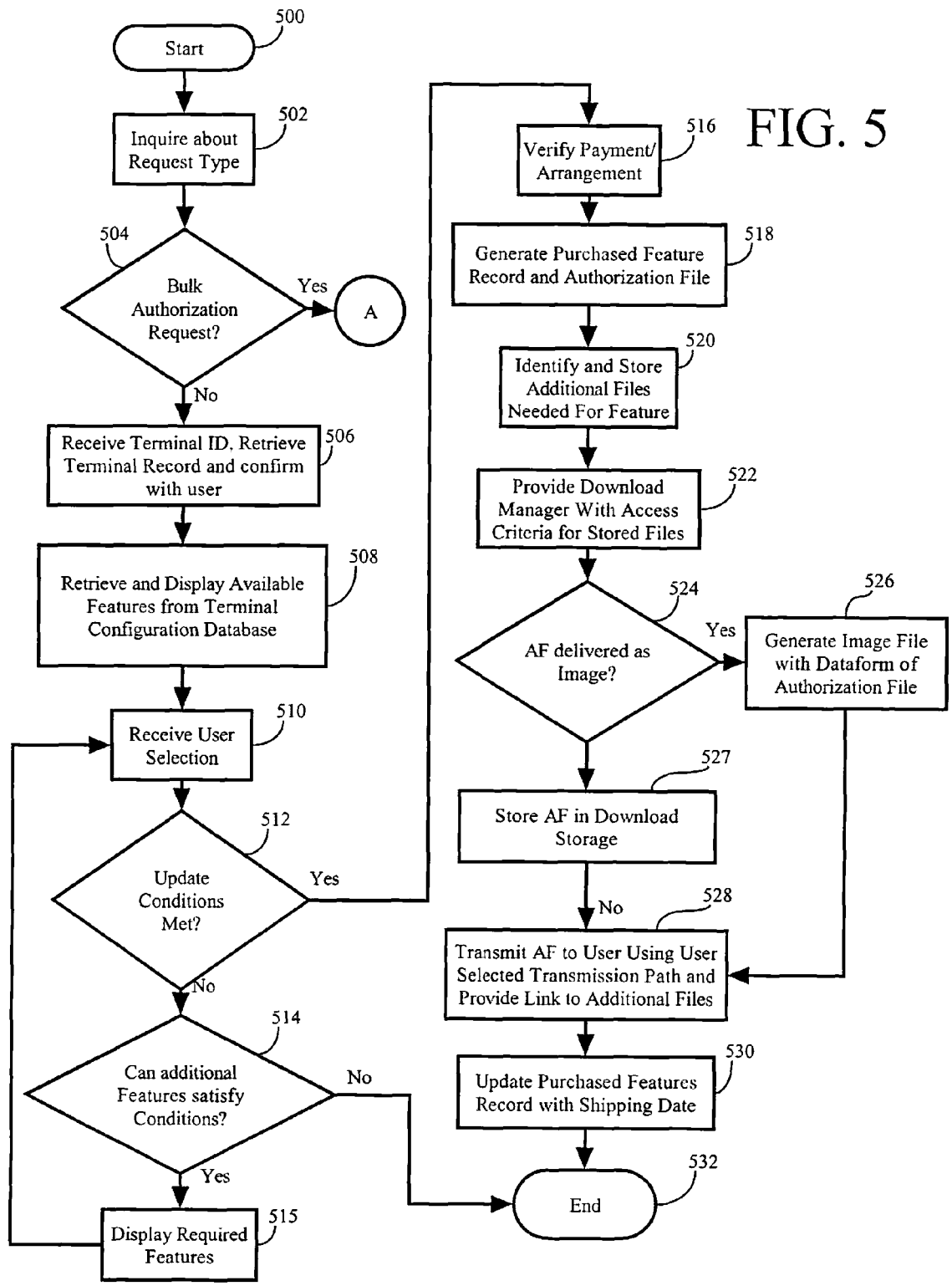
FIG. 5 is a flowchart of the operation of an authorization system in accordance with at least one embodiment of the present invention.

FIG. 5 is a flowchart of the operation of the authorization system 301 in accordance with at least one embodiment of the present invention. The method starts in step 500 with the user activating the customer interface 306 (see FIG. 3). In step 502, the user is requested to provide an indication of the type of change request being ordered. As noted, there are generally two types of change requests: individual authorization requests wherein one or more individual DCDs 302n are each uniquely identified, and bulk authorization requests which cover a group of unspecified DCDs 302n. In step 504, the method receives the type of change request. If the order is for a bulk authorization request, the method proceeds to the steps illustrated in FIG. 6. If the order is an individual change request, the method proceeds to step 506.

In step 506, a user inputs identification information (e.g. serial number or other identifying information) of the DCD(s) 302n for which the change request is being submitted. The manager 310 retrieves corresponding records from the terminals table 402 using the identification number(s). In particular, the manager 310 accesses the terminals table 402 of the terminal configuration database 318 and retrieves records associated with the identified DCD(s) 302n. In the example illustrated in FIG. 4, a terminal record generally comprises a terminal ID (such as a serial number), a terminal type (such as a model number), an identification of the customer, the last known location of the DCD 302n, the last time the feature set was changed on the DCD 302n (or if no changes have been made—the purchase date of the DCD 302n), and in the event that a keyed encryption is employed to secure the authorization filed or license key (e.g. symmetric or PKI) the applicable key(s). Relevant portions of the retrieved record are displayed to the user for confirmation that the correct record has been accessed.

Next in step 508, using the terminal type as a search key, a list of features available for purchase for that terminal type is generated from the features table 406. The records in the features table 406 may include an identification of the feature, a description of the feature, a version number of the feature, a type of feature (e.g. new hardware, new software, activation of existing feature, etc. . . . ), the applicable terminal type for which the feature is suitable, whether the feature is currently available for purchase, a link to files (if any) associated with the feature, and the standard price for the feature. The list of features is updated to correspond to the individual DCDs 302n by removing features already installed on the DCD 302n (as determined by a check of the purchased features table 404 using the terminal ID as a search key). The list of features currently available for purchase for each DCD 302n is provided to the user. Thereafter, in step 510, the user selects one or more features to purchase.

In step 512, a check is made to ensure that the identified DCD 302n meets any configuration requirements for installing the requested feature, such as memory, operating system, etc. A configuration requirements list may be generated by first searching the feature conditions table 408 using the IDs of the feature(s) selected by the user. The feature conditions table 408 generally includes records cross-referencing required features with each identified feature. In addition, a condition type (e.g. mandatory, suggested, optional) may be provided. Next, a list of installed features is compiled for the DCD 302n by searching the purchased features table 404 using the terminal ID of the DCD 302n. Finally, by comparing the list of configuration requirements with the list of installed features, a determination may be made as to whether there are any outstanding conditions that should be met prior to installing the desired feature. It is to be noted that the manufacturer may make some or all features available without condition.

Next, in step 514, a determination is made as to whether outstanding configuration requirements may be satisfied by installing additional available features using the authorization system 301. Such a determination may be made by checking the "Available for Purchase" field of the features table 406 of each of the unsatisfied conditions or prerequisites.

If additional features can satisfy the outstanding conditions, the additional required features are displayed in step 515 and the methods returns to step 510 for user input. If the outstanding conditions cannot be satisfied, the method proceeds to 532 and ends—preferably with a notification to the user that the requested feature is not available and a suggestion to contact the manufacturer for additional options. It is also possible using the structure illustrated in FIG. 4 to identify features which the user has purchased but for which no installation has been performed. In such a case, a note reminding the user to install the outstanding features may be presented to the user.

Once an available feature(s) has been selected for which all mandatory conditions have been met, the method proceeds to step 516 and payment arrangements are made. Depending on the business environment and the nature of the parties, such arrangements can run the gamut from a credit card transaction to the issuance of a purchase order and/or an invoice. Of course, the manufacturer may also decide to satisfy the change request at no additional cost. The database 400 illustrated in FIG. 4 supports a pre-paid model wherein a user maintains an account balance recorded in the account balances table 410. The account balances table 410 also facilitates the extension of credit to a customer along with the use of promotional credits.

Once the conditions have been deemed satisfied and payment terms, if any, have been agreed upon, the change request is deemed authorized and the method proceeds to step 518 wherein a purchased feature table 404 record and an authorization file are generated.

The purchase feature record as illustrated in FIG. 4 may include a transaction number, an identification of the terminal on which the feature is installed, an identification of the authorized feature, the date the feature was authorized, a price paid, a shipping date (e.g. the date the files associated with the feature were made available to the user), and a date on which the feature was installed and activated by (or on behalf of) the user. At this time, a shipping date field and date activated field are left NULL.

As noted, authorization files may be any string of data that can be used by software on the receiving DCD 302n to verify that the feature being activated (and installed if necessary) has been authorized by the authorization system 301 and is being correctly applied to the subject DCD 302n. For example, the authorization file may include a PKI certificate to prove the identity of the authorization system 301, identification information of the authorized DCD 302n, and an indication of the feature being authorized. To link such data to a particular DCD 302n, the entire file (or a portion thereof) can be encrypted using the serial number of the DCD 302n.

Next, the method proceeds to step 520 and additional files, if any, required to activate and/or install the feature are identified and stored in the download storage 316. In the case of a software feature being installed and activated, such files may be formatted as .cab files, compressed files, executable files, or any other suitable type of file. The features table 406 provides a field to identify, or link to, such additional files.

Thereafter, in step 522, access criteria for downloading the files are provided to the download manager 314. Possible access criteria may, for example, comprise a user name and password that must be supplied or a certificate based on a PKI scheme. Additionally, the user may be requested to provide details regarding how the files associated with the change request are to be delivered to the DCD 302n. For example, the files may be transmitted directly to the DCD 302n via a wireless internet or cellular connection, made available on download manager 314, or some intermediary device, such as a PC 308 or download controller 315n. Additionally, the user may specify a format for delivery of the authorization file, such as an electronic data file or encapsulated within a dataform (e.g. barcode).

A determination is then made in step 524 as to whether the authorization file (referred to as "AF" in FIG. 5) is to be delivered as a dataform. If the authorization file is to not be delivered as a dataform, the method proceeds to step 527 and the authorization file is stored on the download storage 316. Access is provided to the user via the download manager 314 as described herein below.

For DCDs with a data collection device, such as a barcode reader or RFID scanner, one viable delivery method is to scan a dataform containing the authorization file. While the present description will assume the use of an optically scanned dataform, such as a two dimensional barcode, neither the described embodiments nor the invention are so limited. If, in step 524, it is desirable to utilize a dataform as the transport mechanism for the authorization file, the method proceeds to step 526 and an image file containing the dataform is generated. A link and password to retrieve any associated files identified in step 520 may also be included within the dataform. In particular, the dataform may include name or IP address of a server to connect to, the names of files to download and install, and potentially other options like time and date that that the DCD 302n should connect to the server, backup server details in case the primary server is unreachable, and installation validation parameters. For convenience the barcode need not be printed but could be read from the screen of a cellphone, PDA, or PC. This would allow for users to receive the dataform electronically (e.g. via email) and then simply view and scan the barcode on the DCD 302n.

Thereafter, in step 528, the authorization file and links to associated files are transmitted to the user. For example, if the user selected a dataform as the format, the transmission medium can comprise any medium capable of transmitting an image file, such as facsimile, printer, e-mail, RFID, cellular, etc. . . . It is to be noted the image file can also be stored on the download storage 316 and provided to the user as a link via the download manager 314. The user should also be provided with an indication of any security measures required to access to the files on the download storage 316. At this point the user has been provided with an authorization file and access to any files needed to enable the requested changes. It should be noted that for many features, such as those turning ON latent features, the only file needed to implement the feature is the authorization file. Next, in step 530, the associated record(s) in the purchase features table 404 are updated to reflect the shipping/authorization date. Thereafter, the method is ended in step 532.

Figure 6A:
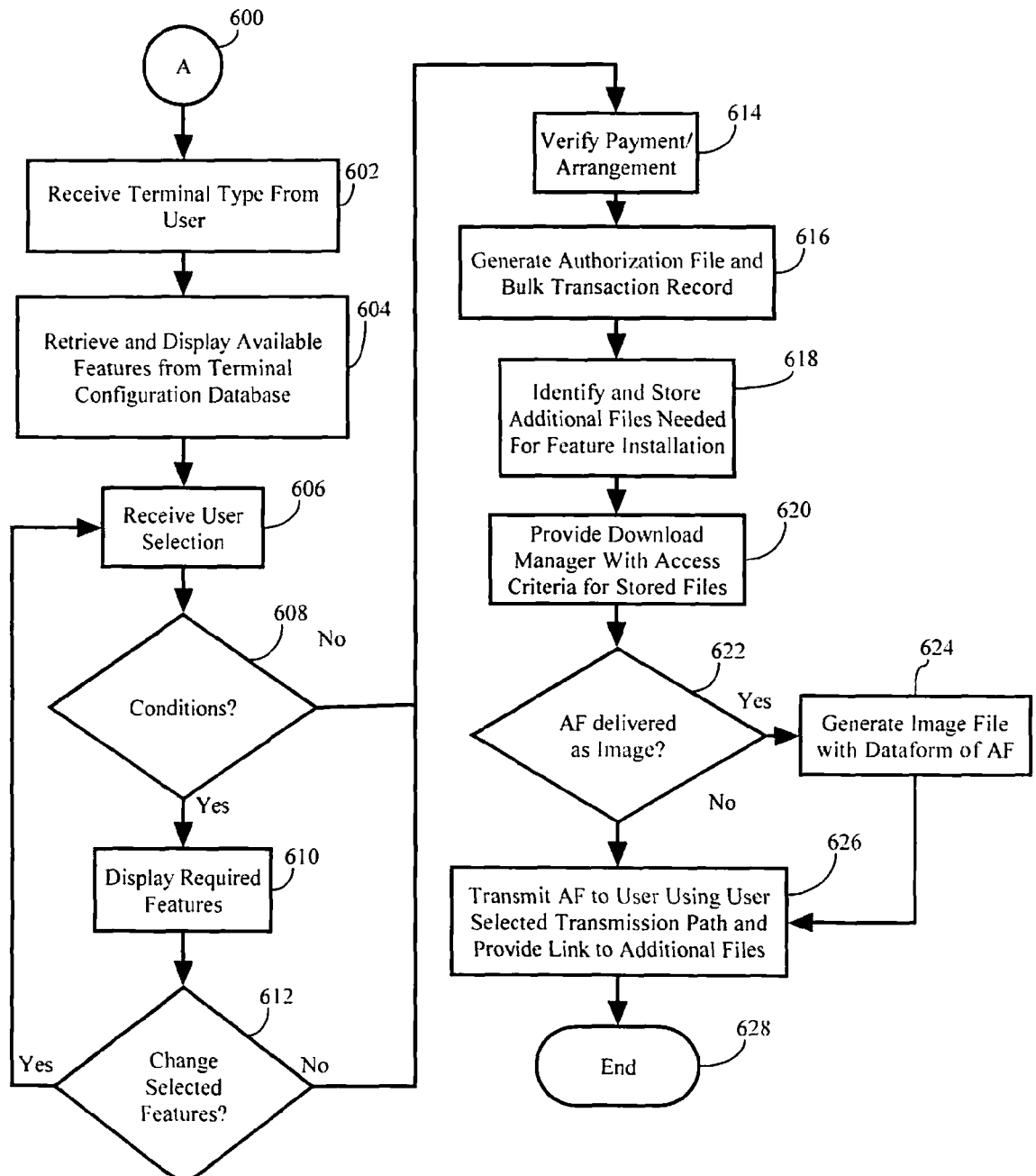
FIGS. 6a and 6b are flowcharts of the operation of an authorization system in accordance at least one embodiment of the present invention.

If, in step 504, the change request is a bulk authorization request, the method proceeds to step 600 found in FIG. 6*a*. In general, a bulk authorization is where the terminal(s) are referred to using a group identifier, such as a model number, as opposed to an identifier that is unique with respect to each DCD 302*n*. The database 400 illustrated in FIG. 4 is generally adapted to handle grouping by terminal type. Other types of grouping are within the scope of the present embodiment, such as customer ID, geographical location, date of purchase, part numbers, etc., along with any combination thereof. Further, while it is envisioned that bulk authorization requests will generally involve a plurality of terminals, the method may also be used to modify the feature set of a single unit.

In step 602, a group identifier, such as a terminal type is obtained from the user, e.g. by clicking on a designation associated with a terminal type. Next, in step 604, the manager 310 retrieves from the features table 406 a list of features that are available for purchase for the terminals or terminal type(s) selected by the user. The list is displayed to the user and a selection of one or more features is made in step 606.

In step 608, a determination is made as to whether any conditions exist by searching the conditions table 408 using the terminal type selected by the user. If conditions exist, the method proceeds to step 610 and a list of conditions is displayed to the user. Generally, for bulk change requests, no check is made to determine the suitability of the requested changes for an individual DCD 302*n*, rather it is up to the user to ensure that all DCD 302*n* upon which the feature is to be installed are suitable. Alternatively, the manager 310 may retrieve individual records for each DCD 302*n* owned by the customer that belongs to the group of devices identified by the user. A report may be provided to the user indicating which of the units will accept the requested changes and those units for which the requested changes will create problems. In any event, next, in step 612, the user is given the option of changing his order, for example by adding features (through a return to step 606) or to continue with the current order.

Once the user is satisfied with the order, the method proceeds to step 614 and payment arrangements are made. Such arrangement may include a determination of the number of installations to be authorized by the resultant authorization file.

Next in step 616, an authorization file and a record for the bulk transactions table 412 are generated. For bulk authorization requests, authorization files may be any string of data that can be used by software on the receiving DCD 302*n* to verify that the requested changes to the license key are authorized by the authorization system 301. One example of a suitable verification mechanism is a PKI certificate proving the identity of the authorization system 301. Another option is to utilize the group identifier and either include same in the authorization file or to encrypt the authorization using the identifier. For example, it may prove helpful to provide unique SKUs for each model of DCDs 302*n* sold to a customer—or at least those customers to whom the possibility of bulk licensing is to be extended. An authorization file may then be created for each SKU group by encrypting the authorization using the custom SKU. A single authorization file may then be applied to each DCD 302*n* of a certain model owned by a particular customer.

It may be desirable, but not necessary, to further provide a mechanism to track the number of devices upon which the feature is installed. Such a mechanism would be beneficial where a customer only wants to modify a subset of their inventory of a certain model DCD, or where the size of a client does not support the use of custom SKUs. For such situations, the bulk transaction table 412 illustrated in FIG. 4 may be used to keep track of the number of times a feature has been installed. It is to be noted that a variety of apparatus and methods may be used to keep track of the number of features installed under a single authorization file. Records in the bulk transaction table 412 illustrated in FIG. 4 each include a bulk transaction number, a customer ID, an indication of the authorized feature, an indication of the date the feature is authorized, a price paid, a shipping date, and an indication of the remaining number of authorized installations available to the user. Initially, the remaining number of authorized installations will be set to the amount requested and paid for by the user. During the feature change process, the DCD 302*n* performing the process will initiate a connection with the authorization system seeking authorization for changing the feature set. Upon approval of the authorization request, the table 412 will be updated by subtracting the number of installed features from the remaining installs. Further details may be found in FIG. 6*b*.

Next, in step 618 any additional files (be they data, executable, or otherwise) required to apply the feature are identified and stored in the download storage 316. Thereafter, in step 620, the access criteria for downloading the files are provided to the download manager 314. Additionally, the user may be requested to provide details regarding how the files associated with the bulk change request are to be delivered to the DCD 302*n*. For example, will the DCD 302*n* log onto the download manager 314, or will some agent, such as a PC 308 or download controller 315*n*, act as an intermediary, Additionally, the user may specify a format for delivery of the authorization file, such as an electronic data file or encapsulated within a dataform (e.g. barcode).

Next, in step 622, a determination is made as to whether the authorization file is to be delivered as an image. If it is desirable to utilize a dataform as the transport mechanism for the authorization file, the method proceeds to step 624 and an image file containing the dataform is generated. A link and password to retrieve any associated files may also be included within the dataform.

If, in step 622, the authorization file is to not be delivered as a dataform, the method proceeds to step 625 and the authorization file is stored on the download storage 316.

In either event, the method proceeds to step 626 wherein the authorization file and links to any associated files are made available to the user as in step 626 in FIG. 6*a*. This generally involves providing the user with the usernames, passwords, and credentials needed to access the download storage 316. However, if the user selected a dataform as the format, the dataform may be transmitted to the user via any medium capable of transmitting an image file, such as facsimile, printer, e-mail, cell phone, RFID, display screen, etc. . . . It is to be noted the image file can also be stored on the download storage 316 and provided to the user as a link via the download manager 314. At this point the user has been provided with access to all files needed to enable the requested changes. As no specific DCDs 302n have been identified, no record in the purchased features table 404 need be generated, or an update record may be generated and associated with a bulk designator; otherwise, the profiles for the specific units identified by the system and selected by the user may be updated to reflect the changes. Thereafter, the method is ended in step 628.

Once the authorization file and any supporting files are loaded into the download storage, or otherwise made ready for transfer, the next task is to transmit the files to the DCD(s) 302n. Many changes still only require an update of the license key based on an authorization file. Other changes will require the transfer and installation of software in addition to updating the license key. It is also anticipated that some changes will further require the installation of additional hardware components or peripherals.

The data and files that implement the change request (e.g. the authorization file and any necessary software) may be transmitted to the DCD 302n in any convenient manner, including the use of physical transfer devices such as USB flash memory devise. FIG. 3 illustrates a couple of potential transmission paths.

DCD 302a illustrates the use of a network connection to transfer the files associated with a change request. The network 304 represents a variety of networks, including local and wide area networks, such as LANs and the Internet. However, those of ordinary skill in the art will recognize that most any network may be utilized, such as ATM cellular networks (GSM, CMDA, etc. . . . ). As such, the files may be transmitted using whatever transmission protocol is suitable for the nature of the network 304, such as FTP, e-mail, via a remote device management system, or even a text message via a cellular network. In this mode of operation, the manager 310 may either push the entirety of the file(s) over the network 304 to the DCD 302a or push a smaller message and provide the requesting user a link to and credentials for any files not transferred with the message, i.e. those files for which a pull operation is more desirable. For example, the smaller message may contain the authorization file and instruction on how to retrieve any associated files. Such instruction may, for example, comprise URLs sent as part of the message or they may be contained on a web page referenced by the message and retrieved by the DCD 302a. It should be noted that the message may be displayed on the user's screen as part of the purchase process and as such may be initially viewed with the PC 308.

If a link to the necessary files is transmitted, as opposed to the files themselves, the user directs the DCD's 302a browser or FTP client to the link, provides any required credentials, and downloads the file(s) from the download storage 316 via the download manager 314.

The DCD 302b (see FIG. 3) illustrates the use of dataforms. Where the authorization file and any related files meets any relevant size limitations, the entire data set can be encoded into one or more dataforms and transferred in any appropriate manner. Alternatively, the dataform may contain the authorization file along with links to related files, where the length of such files exceeds the capacity of the dataform (or series thereof). The image of the dataform is transmitted and printed or displayed to be scanned by the DCD 302b. Once the dataform has been scanned, the DCD 302b downloads any indicated support files and performs the appropriate process to enable the requested changes.

As the underlying data is image data, the authorization file may be transmitted using any format and medium suitable for image transfer, including facsimile, mail, RFID, or cellular messaging. The dataform(s) may be transmitted in a variety of manners. For example, the file can be transmitted to a PC 308 and subsequently printed on a printer 322. Alternatively, if the printer 322 is network capable or has facsimile capabilities, the image file can be sent directly from the manager 310 to the printer 322. The dataform(s) may also be transmitted as an image file to any device capable of displaying an image, for example on a monitor. One notable example is to transfer dataforms as an images to a cell phone. The images of the bar code on the display of the cell phone may be scanned to transfer the data to a DCD 302n. Alternatively, the image can be transferred to another DCD 302n for display.

It should be noted that while each bar code symbology has a limit on the amount of information that may be encoded therein, techniques exist to communicate larger amounts of information through bar codes, and these techniques may be used to reprogram the scanning units. That is, bar codes may be used not only to help the update process, but to actually carry it out by encoding all executables and data required to accomplish the update. These techniques involve splitting the data among two or more bar code symbols and then scanning the resulting set. This may be done where the symbols are displayed in tangible form, as by being printed on a substrate, or by using a display to read multiple bar codes in succession: see U.S. patent application Ser. No. 11/586,481, filed Oct. 25, 2006, the entirety of which is hereby incorporated by reference thereto.

Once the files related to the change request have been transferred to the DCD 302n, the appropriate processes to implement the requested changes are executed. Generally, the changes will be implemented using a program residing in memory on the DCD 302n. The program may be executed in a terminate-and-stay-resident mode of operation such that as messages are received and data input, the program may trap those messages and input streams that contain predefined data sequences.

The installation method starts by ensuring the authorization file is related to the DCD 302n. For an individual change request this may comprise ensuring that a serial number associated with the authorization file matches the serial number of the DCD 302n. For a bulk change request, this may comprise comparing a model number associated with the authorization file with the model number of the DCD 302n. Next the installation method may want to ensure that the feature set resulting from the requested changes is a valid configuration. Once these checks have been successfully completed, the requested feature set will be enabled. For example, in cases where the feature activates latent features of the DCD 315n, the actual modification may comprise updating the license key (or some other suitable data structure such as a registry key, an array, or sequence of bits). Other possible steps include the installation of files, such as .cab files. After the feature has been authorized and if necessary installed on the DCD 302a, the DCD 302a transmits an activation confirmation message to the manager 310. The message may include the serial number of the DCD 302a and a date that the activation was completed along with a transaction number or a bulk transaction number.

Figure 6B:
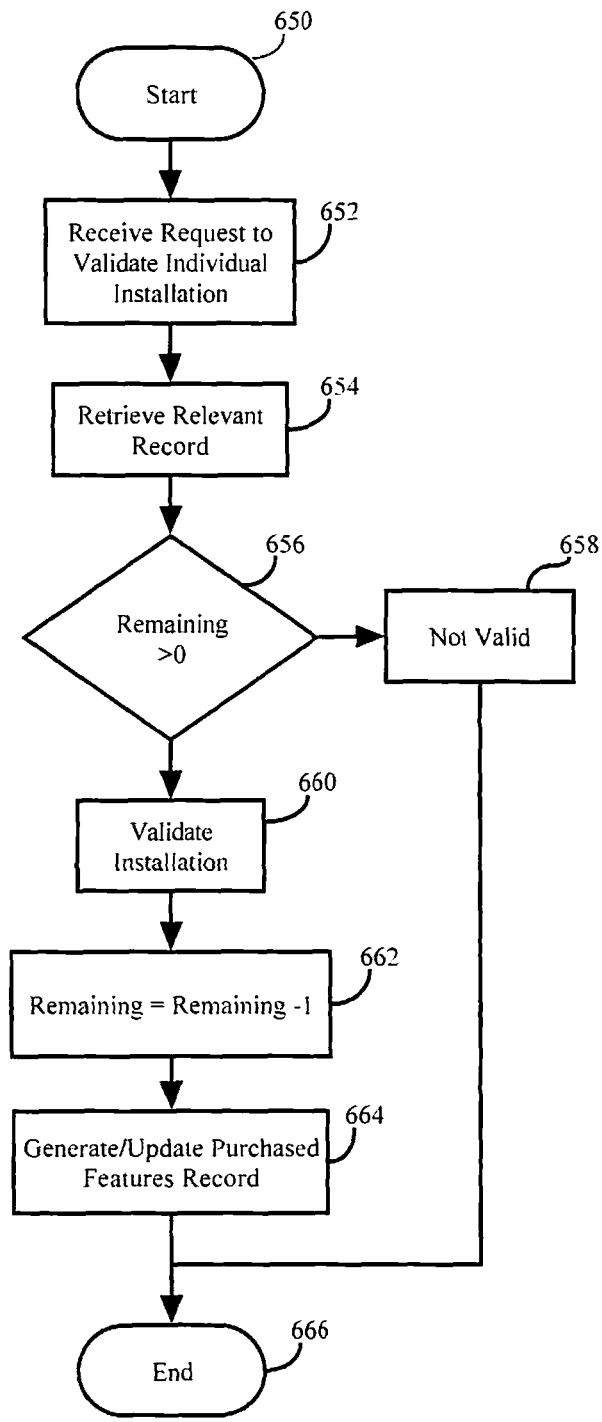

In the case of a bulk change request for which the number of installs is to be tracked, reference is made to FIG. 6b which illustrates a method for monitoring the number of installed features. The method starts in step 650. In step 652, the authorization system 301 receives a request to validate an individual installation based on a bulk license. Such a request should include an identification of the subject DCD 302n along with a bulk transaction number. In step 654, the manager 310 retrieves the relevant record from the bulk transaction table 412. Thereafter, in step 656, the remaining installs field is compared to zero. If the remaining installs equals zero, the method goes to step 658, the change request is declared not valid and the method ends in step 666 (preferably with an explanatory error message to the user). Assuming that the remaining installs is greater than zero, the method proceeds to step 660 and the installation is validated. It may prove useful to charge for the bulk change request on a per unit basis as the features are installed. In such a case, the method illustrated in FIG. 6b would be modified to condition validation on receipt of payment, using for example the billing interface 320. In any event, as part of step 660, a validation message is transmitted to the requesting DCD 302n. Thereafter, one is subtracted from the remaining installs in step 662 and, in step 664, a purchased feature record is generated (or updated) in the purchased feature table 404 for the requesting DCD 302n. Thereafter, the method ends in step 666.

In most cases, DCDs 302n are mobile devices for which a desirable communication path may or may not exist when a change of the feature set is desired. For example, a customer may wish to restrict access from DCD 302n to outside networks such as the Internet. It may therefore prove necessary to provide a temporary (or permanent) storage, local to the customer and accessible by the DCD 302n, for files retrieved from the download manager 314. FIG. 3 illustrates one possible solution using one or more download controllers 315n preferably, although not necessarily, residing at a customer site. The general function of the download controller 315n is to access and stores files from the download manager 314 for subsequent transfer to DCDs 302n.

In perhaps the simplest embodiment, the download controller 315a essentially acts to store and forward files received from the download manager 314. In such an embodiment, the download controller 315a may comprise storage space, such as the PC 308 or a portable flash memory device. Files may be downloaded to the download controller 315a via a browser or ftp client residing on the PC 308. Subsequent transfer to the destination DCD 302n may take place using any of a variety of available transmission paths such as ACTIVESYNC from MICROSOFT, a text message via a supported cellular standard, a serial connection, or through the formation of a TCP/IP connection. The downloaded files may also be distributed using any number of remote device management solutions such as MOBIcontrol from SOTI. It is to be noted that intermediary devices (such as an additional download controller 315b or other DCDs, such as the DCD 302c) may be utilized to distribute the workload and connectivity of the download controller 315a.

In alternative embodiments, the download controller 315n may take a more active role in the process. For example, the download controller 315n can mirror the data and functions of the manager 310 and the download manager 314 by maintaining feature records and determining the applicability of available files for a particular DCD 302. It may even prove beneficial for the download controller 315n to be provided as a pre-programmed embedded system from the manufacturer. For example, software for turning a personal computer into a download controller may be provided on a flash memory device, such as a USB dongle. The download controllers 315n may be further enhanced by offering software for maintaining indications of authorized features that are available but have not yet been applied (e.g. a copy of the necessary files has been transferred to the download controller 315n). When a DCD 302n connects to a download controller 315n, a check is made as to whether the DCD 302n has been authorized for a feature. In the event a feature has been authorized, but not yet applied, the appropriate file is pushed to the DCD 302n.

Figures 7A, 7B:
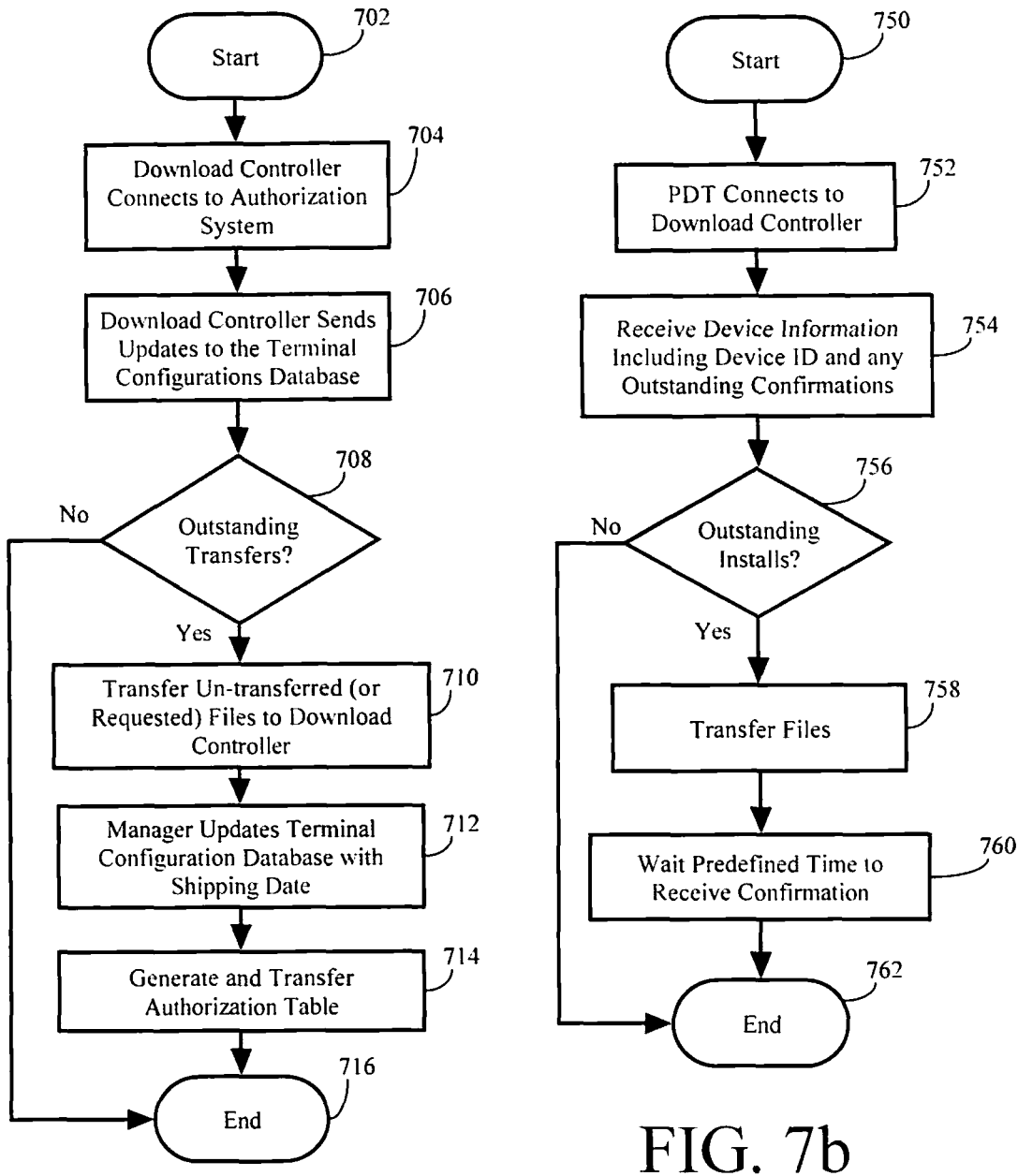
FIGS. 7a and 7b are flowcharts of the operation of a download controller in accordance with at least one embodiment of the present invention.

FIGS. 7a and 7b are flowcharts of the operation of a download controller 315 in accordance with an embodiment of the present invention. FIG. 7a illustrates a method related to connecting the download controller 315a to the authorization system 301. The method starts in step 702. In step 704, the download controller 315 initiates connection with and provides access/identification information to the authorization system 301. The connection may be initiated on a periodic basis or ad hoc when a new feature has been requested. Such a connection may be through the customer interface 306, or with the manager 310. Next, in step 706, the download controller 315 sends updates for the terminal configuration database 318 to the manager 310. These updates represent actions taken by the download controller 315a (or the download controller 315b) since the last connection with the authorization system 301. The updates may take the form of transaction posts that create, delete, or modify records in the database 400.

Thereafter in step 708, the manager 310 utilizes the access identification information obtained in step 706 to determine whether any outstanding features need to be transferred from the authorization system 301 to the download controller 315a. To facilitate identification of outstanding transfers, the database structure illustrated in FIG. 4 may be modified to link individual download controllers to the purchased features table 404 and bulk transaction table 412. Additionally a download controller may also be related to one or more terminal IDs to aid the user in selecting an appropriate download controller when purchasing a new feature.

If there are no outstanding transfers, the method ends in step 716. If outstanding transfers await, the method proceeds to step 710. In step 710, the outstanding transfers are transmitted to the requesting download controller 315n. In step 712, the terminal configurations database 318 is updated to include a shipping date for those features specifying a DCD 302n.

In step 714, the manager 310 generates an authorization table and transfers same to the connected download controller 315n. The purpose of the authorization table is to recreate a relevant portion of the terminal configuration database 318 on the download controller 315n. For example, the relevant portion may comprise that portion of the terminal configuration database 318 related to the transferred files. Alternatively, the relevant portion may comprise the entire database or just that portion of the database related to a particular customer ID. By copying the relevant portion of the terminal configuration database 318 (along with any relevant files), the download controller 315n may act as a mirror for the authorization system 301. Practically, this allows the modification of DCDs 302n without a direct connection to the authorization system 301 while maintaining the integrity of the process and the terminal configuration database 318.

FIG. 7b illustrates a method related to connecting the download controller 315a to a DCD 302n. The method starts in step 750. In step 752, a DCD 302c initiates a connection with a download controller 315a. Such a connection may be initiated in a variety of manners, including the use of ACTIVESYNC over any of a number of transmission mediums (IrDA, USB, Bluetooth radio). The connection may be initiated automatically on a periodic basis (using whatever connection exists) or as part of a regular routine (e.g. storing the DCD 302c in a home base during an off-duty period).

Next in step 754, the download controller 315a requests and receives the DCD 302c's identification number and any outstanding installation confirmations for features changes that have not been previously reported to the download controller 315a. Next in step 756, using the identification number, the download controller 315a queries the local copy (or portion) of the terminal configuration database 318 to determine whether there are any outstanding change requests for the DCD 302c. If there are no outstanding requests, the method proceeds to step 762 and the method ends. Otherwise, the method proceeds to step 758 wherein files associated with the change request are transferred to the DCD 302c.

Next, in step 760, the download controller 315a waits a predetermined time period for the receipt of one or more installation confirmations. If the method times out prior to receiving the confirmation, such confirmations will be transferred when the DCD 302c next connects to the download controller 315a. The method ends in step 762.

Although some embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method for changing a configuration of a remote data collection device, the method comprising:
    maintaining a first data structure on the remote data collection device that stores values describing the operation of features of the data collection;
    receiving at a computer system different from the remote data collection device a request for a new configuration of the data collection device, the request including an identifier for the data collection device, identification of one or more features, and for each identified feature, an indication to modify the operation of the feature:
using the computer system, generating a second data structure to update the first data structure in accordance with the request;
    transmitting the second data structure to the data collection device; and
    updating the first data structure based on the second data structure;
    wherein the step of transmitting the second data structure to the data collection device comprises generating a barcode, magnetic media or radio-frequency identification (RFID) tag bearing the second data structure and scanning the barcode, magnetic media or radio-frequency identification (RFID) tag with the data collection device utilizing a scan engine to decode the output of the data of the barcode, magnetic media or radio-frequency identification (RFID) tag.

2. A method, as set forth in claim 1, wherein the identifier is a group identifier.

3. A method, as set forth in claim 2, wherein the group identifier is a model number.

4. A method as set forth in claim 1, further comprising:
    maintaining a record of the current configuration of the data collection device;
    maintaining a database indicating suitable configurations of data collection devices;
    when a request is received; identifying whether the data collection device is suitable for the new configuration; and
    wherein the steps of generating, transmitting and updating are contingent upon the data collection device being suitable for the new configuration.

5. A method, as set forth in claim 1, further comprising:
    wherein the steps of generating, transmitting and updating are contingent upon the receipt of payment.

6. A method, as set forth in claim 4, further comprising:
    wherein the steps of generating, transmitting and updating are contingent upon the receipt of payment.

7. A method, as set forth in claim 1, wherein the second data structure is encrypted; and
    wherein the step of updating is contingent upon successfully decrypting the encrypted data structure.

8. A method, as set forth in claim 7, wherein the second data structure is encrypted using the identifier of the data collection device.

9. A method, as set forth in claim 7, wherein the second data structure is encrypted using a symmetric key.

10. A method, as set forth in claim 7, wherein the second data structure is encrypted in accordance with a Public Key Infrastructure (PKI) methodology.

11. A method, as set forth in claim 7, wherein the second data structure is encrypted using an asymmetric key.

12. A method, as set forth in claim 1, wherein the step of transmitting the second data structure to the data collection device comprises generating a text message bearing the second data structure and transmitting the text message to the data collection device using a cellular network.

13. A method as set forth in claim 1, wherein the step of transmitting the second data structure to the data collection device comprises transmitting the second data structure to an intermediate device and subsequently transmitting the second data structure to the data collection device.

14. A method as set forth in claim 1, wherein the step of transmitting the second data structure to the data collection device comprises transmitting a location from which the second data structure may be downloaded.

15. A method, as set forth in claim 1, wherein the second data structure further includes files necessary to implement the requested changes.

16. A method, as set forth in claim 1, further comprising:
    transmitting to the data collection device files necessary to enable features enabled by the second data structure.

17. A method as set forth in claim 16, wherein the files are encrypted.

18. A method as set forth in claim 1, further comprising:
    transmitting to the data collection device a location to download files necessary to enable features enabled by the second data structure.

19. A method, as set forth in claim 1, wherein the identifier comprises a serial number.

20. A method, as set forth in claim 1, wherein the identifier comprises a Stock-keeping unit (SKU).

21. A method, as set forth in claim 1, wherein the identifier comprises a model number.

22. A method as set forth in claim 1, wherein the values in the first data structure include an indication to enable or disable the operation of a feature.

23. A method, as set forth in claim 1 wherein the values in the first data structure include an indication to enable the operation of a feature for a period of time.

24. A method, as set forth in claim 1, wherein the values in the first data structure include an indication to enable the operation of a feature for a predetermined number of operations.

25. A method, as set forth in claim 1, wherein the values in the first data structure include an indication to enable the operation of a feature and at least one parameter for the operation thereof.

26. The method of claim 1, wherein the step of transmitting the second data structure to the data collection device comprises generating a barcode bearing the second data structure and scanning the barcode with the data collection device utilizing a scan engine to decode the output of the data of the barcode.

27. The method of claim 1, wherein the step of transmitting the second data structure to the data collection device comprises generating a magnetic media bearing the second data structure with the data collection device utilizing a scan engine to decode the output of the data of the magnetic media.

28. The method of claim 1, wherein the step of transmitting the second data structure to the data collection device comprises generating a radio-frequency identification (RFID) tag bearing the second data structure and scanning the radio-frequency identification (RFID) tag with the data collection device utilizing a scan engine to decode the output of the radio-frequency identification (RFID) tag.

29. A system comprising:
a plurality of data collection devices, each data collection device operable in accordance with a plurality of features and including a memory with a first data structure that stores values describing the operation of features of the data collection, each data collection device further including an update program to update the first data structure based on a second data structure;
a customer interface system that receives a request to change the configuration of a data collection device, the request including an identifier of the data collection device, identification of one or more features, and for each identified feature an indication to modify the operation of the feature; and
a manager that, responsive to the request received by the customer interface, generates a second data structure to update the first data structure in accordance with the request, and facilitates the transmission of the second data structure to the identified data collection device wherein the second data structure is transmitted to the data collection device by generating a barcode, magnetic media or radio-frequency identification (RFID) tag bearing the second data structure and scanning the barcode, magnetic media or radio-frequency identification (RFID) tag with the data collection device utilizing a scan engine to decode the output of the data of the barcode, magnetic media or radio-frequency identification (RFID) tag.

30. A system, as set forth in claim 29, wherein the identifier is a group identifier.

31. A system, as set forth in claim 30, wherein the group identifier is a model number.

32. A system, as set forth in claim 29, further comprising:
a database having records indicating a current configuration of the data collection device;
a database indicating suitable configurations for types of data collection devices; a process, in communication with the customer interface, for determining whether the identified data collection device is suitable for the new configuration; and
wherein the manager only generates the second data structure if the process determines that the data collection device is suitable for the new configuration.

33. A system, as set forth in claim 29, further comprising:
wherein the manager only generates the second data structure when payment conditions have been satisfied.

34. A system as set forth in claim 29, wherein the manager encrypts the second data structure; and
wherein the update program only updates upon successfully decrypting the second data structure.

35. A system, as set forth in claim 34, wherein the second data structure is encrypted using the identifier of the data collection device.

36. A system, as set forth in claim 34, wherein the second data structure is encrypted using a symmetric key.

37. A system, as set forth in claim 34, wherein the second data structure is encrypted in accordance with a PUBLIC KEY INFRASTRUCTURE (PKI) methodology.

38. A system, as set forth in claim 34, wherein the second data structure is encrypted using an asymmetric key.

39. A system, as set forth in claim 29, wherein the second data structure is transmitted to the data collection device as a text message using a cellular network.

40. A system, as set forth in claim 29, wherein the second data structure is transmitted to the data collection device by generating a dataform bearing the second data structure and scanning the dataform with the data collection device.

41. A system, as set forth in claim 29, wherein the second data structure is transmitted to the data collection device via an intermediate device.

42. A system, as set forth in claim 29, further comprising:
a data storage device for storing the second data structure and from which the second data structure may be downloaded.

43. A system, as set forth in claim 29, wherein the second data structure further includes files necessary to implement the requested changes.

44. A system, as set forth in claim 29, wherein the second data structure includes files necessary to enable features enabled by the second data structure.

45. A system, as set forth in claim 44, wherein the files are encrypted.

46. A system, as set forth in claim 29, further comprising:
a data storage device for storing files necessary to enable features enabled by the second data structure.

47. A system, as set forth in claim 29, wherein the identifier comprises a serial number.

48. A system, as set forth in claim 29, wherein the identifier comprises a STOCK-KEEPING UNIT (SKU).

49. A system, as set forth in claim 29, wherein the identifier comprises a model number.

50. A system, as set forth in claim 29, wherein the values in the first data structure include an indication to enable or disable the operation of a feature.

51. A system, as set forth in claim 29, wherein the memory is a secondary non-volatile memory physically distinct from a main memory of the data collection device.

52. A system, as set forth in claim 29, wherein the memory is an Electrically Erasable Programmable Read-Only Memory (EEPROM).

53. A system, as set forth in claim 52 wherein the Electrically Erasable Programmable Read-Only Memory (EEPROM) is physically distinct from a main memory of the data collection device.

54. A system, as set forth in claim 29, wherein the values in the first data structure include an indication to enable the operation of a feature for a period of time.

55. A system, as set forth in claim 29, wherein the values in the first data structure include an indication to enable the operation of a feature for a predetermined number of operations.

56. A system, as set forth in claim 29, wherein the values in the first data structure include an indication to enable the operation of a feature and at least one parameter for the operation thereof.

57. The system of claim 29, wherein the second data structure is transmitted to the data collection device by generating a barcode bearing the second data structure and scanning the barcode with the data collection device utilizing a scan engine to decode the output of the data of the barcode.

58. The system of claim 29, wherein the second data structure is transmitted to the data collection device by generating a magnetic media bearing the second data structure and scanning the magnetic media with the data collection device utilizing a scan engine to decode the output of the data of the magnetic media.

59. The system of claim 29, wherein the second data structure is transmitted to the data collection device by generating a radio-frequency identification (RFID) tag bearing the second data structure and scanning the radio-frequency identification (RFID) tag with the data collection device utilizing a scan engine to decode the output of the data of the radio-frequency identification (RFID) tag.

* * * * *